United States Patent [19]
Matsuo et al.

[11] Patent Number: 5,149,487
[45] Date of Patent: Sep. 22, 1992

[54] PREREDUCTION FURNACE OF A SMELTING REDUCTION FACILITY OF IRON ORE

[75] Inventors: Masahiro Matsuo; Genji Kanatani; Hitoshi Kawata; Tatsurou Ariyama; Jirou Mase; Yoshiyuki Kitano; Haruhito Tsuboi; Shinichi Isozaki, all of Kawasaki, Japan

[73] Assignee: NKK Corporation, Tokyo, Japan

[21] Appl. No.: 658,781

[22] Filed: Feb. 20, 1991

[30] Foreign Application Priority Data

Feb. 27, 1990 [JP] Japan .................................. 2-44372
Jun. 16, 1990 [JP] Japan ................................ 2-158154
Jun. 16, 1990 [JP] Japan ................................ 2-158155

[51] Int. Cl.$^5$ .............................................. C22B 5/14
[52] U.S. Cl. .................................... 266/172; 75/444; 75/446
[58] Field of Search ............... 266/172; 75/444, 446

[56] References Cited

U.S. PATENT DOCUMENTS 2,914,388 11/1959 Kelley.
3,398,718 8/1968 Pilloton.
4,886,246 12/1989 Maeda et al. .................. 266/157

FOREIGN PATENT DOCUMENTS

58590/73 8/1972 Australia.
0316819 5/1989 European Pat. Off..
104410 6/1984 Japan .............................. 266/172
1346168 2/1974 United Kingdom.
2011271 7/1979 United Kingdom.
2049894 12/1980 United Kingdom.
2073041 10/1981 United Kingdom.

Primary Examiner—Melvyn J. Andrews
Attorney, Agent, or Firm—Frishauf, Holtz, Goodman & Woodward

[57] ABSTRACT

A prereduction furnace of a smelting reduction facility of iron ore includes of a fluidizing prereduction chamber at an upper part of the prereduction furnace wherein iron ores are fed and prereduced, a gas blowing chamber at a lower part of the prereduction furnace wherein a reducing gas is fed, a ceramic main body of a distributor mounted between the fluidizing prereduction chamber and the gas blowing chamber, a metal box attached to the bottom side of the ceramic main body, which prevent adhesion of dust in the reducing gas, nozzles passing through the ceramic main body and through the metal box for injecting the reducing gas in the blowing chamber, into the prereduction chamber and a discharge pipe for discharging prereduced iron ores mounted at a bottom center portion of the prereduction chamber and extending through the ceramic main body, through the metal box, and through a bottom of the gas blowing chamber.

28 Claims, 18 Drawing Sheets

PREREDUCTION FURNACE OF A SMELTING REDUCTION FACILITY OF IRON ORE

BACKGROUND OF THE INVENTION

1. Field of the Invention

This invention relates to the field of metallurgy, and in particular to a smelting reduction facility, and more particularly to a prereduction furnace of a smelting reduction facility of iron ore.

2. Description of the Related Art

In a smelting reduction facility of iron ore, the facility is generally divided into two major furnaces which are a prereduction furnace and a smelting reduction furnace. The smelting reduction furnace is usually a convertor type reaction vessel. In the smelting reduction furnace, iron ore and a carbonaceous material are fed to a molten iron bath and oxygen is blown into the bath from above the bath through a lance, by which the iron ore is reduced by a smelting reduction reaction. In the prereduction furnace, the iron ore to be fed to the smelting reduction furnace is prereduced by an exhaust gas from the smelting reduction furnace. The prereduction furnace is of a fluidized bed type in which the exhaust gas from the smelting reduction furnace is utilized for fluidizing and reducing the iron ore since the process is economical.

In this fluidized bed process, a bubbling fluidization bed process is excellent in engineering maturity and can advantageously prevent the attrition of the iron ore in its preheating and reduction. FIG. 1 is an explanatory illustration of a smelting reduction facility. As shown in FIG. 1, the smelting reduction facility comprises of the smelting reduction furnace 1, the prereduction furnace 2 which prereduces the iron ores which are to be fed to the smelting reduction furnace 1, the storage bin 3 for a main raw material, i.e., iron ores, and the storage bin 4 for auxiliary raw materials.

The smelting reduction furnace 1 comprises a convertor type reaction vessel 5, the lance 6 inserted through the top opening 5a of the reaction vessel 5, the gas injection nozzles 7 through which a stirring gas is injected into the metal bath, the chute 9 for feeding the prereduced iron ores installed at the hood 8 and the chute 10 for feeding the auxiliary raw materials also installed at the hood 8.

The prereduction furnace 2 comprises a distributor 12 incorporating a large number of nozzles 13, the gas blowing chamber 14 at the bottom of the distributor 12 and the prereduction chamber 15. In the gas blowing chamber 14 the gas inlet 16 is installed. In the prereduction chamber 15 the chute 17 for feeding the iron ores and the gas exhaust outlet 18 are installed.

The prereduced ores are introduced to the discharge pipe 19 via the discharge hole 12a installed at the center of the distributor 12. The discharge pipe extends downward through the bottom of the prereduction furnace 2 and is connected to the supply chute 9 via the L-shaped valve 20 and two intermediate storage bins 21. The gas outlet 11 installed at the hood 8 is connected to the gas supply pipe 22 which is connected to the gas inlet 16 via the dust collecting cyclone 23. The gas exhaust outlet 18 is connected to the gas exhaust pipe 24 which is connected to the dust collecting cyclone 25.

The duct 26 connects the storage bin 3 to the chute 17 for the prereduction chamber 15. The duct 27 connects the storage bin 4 for the auxiliary raw material to the chute 10.

A predetermined quantity of the molten pig iron 28 is accomodated in the smelting reduction furnace 1. The iron ores, after being prereduced in the prereduction furnace 2, are fed to the smelting reduction furnace 1.

The auxiliary raw materials such as coal and flux are fed to the smelting reduction furnace 1 via the chute 10.

Oxygen is blown into the convertor type reaction vessel by the lance 6 vertically inserted through the top opening 5a of the vessel 5. The stirring gas such as nitrogen is injected into the molten pig iron 28 by the gas injection nozzles 7. Carbon monoxide gas is generated by the reaction between the carbon from the carbonaceous material like coal fed to the smelting reduction furnace and the carbon in the molten pig iron 28, and the oxygen gas introduced through the lance 6. A portion of the generated carbon monoxide gas reacts with the excess oxygen introduced through the lance 6 to generate carbon dioxide gas. The iron ores fed into the molten pig iron 28 are melted and reduced by the generated heat in the above-mentioned exothermic reactions and by the reduction agent, i.e., carbon and carbon monoxide gas specified above.

The high temperature exhaust gas from the smelting reduction furnace 1 is discharged from the gas outlet 11 installed at the hood 8, passing through the gas supply pipe 22 and introduced into the gas blowing chamber 14 of the prereduction furnace 2. The high temperature gas is injected into the prereduction chamber 15 through the nozzles 13 of the distributor 12 and preheats and prereduces the iron ores which are fed from the storage bin 3 through the duct 26 and the chute 17.

The prereduced iron ores are introduced to the discharge pipe 19 via the dischage hole 12a installed at the center of the distributor 12 and fed to two intermediate storage bins 21 via the L-shaped valve 20. The prereduced iron ores are alternatively fed to these storage bins and temporarily stored therein. The prereduced iron ores are alternatively discharged from these bins into the smelting reduction furnace 1 through the chute 9. Thus the iron ores are prereduced before the smelting reduction reaction, which enhances the thermal efficiency of the process.

FIG. 2 is a vertical sectional view of the distributor 12. As shown in FIG. 2, the distributor 12 is made of a ceramics, the top surface of which is concave. A plurality of the nozzles 13 are installed in the distributor 12 surrounding the discharge hole 12a.

The distributor 12 is made of a ceramics which is heated by the high temperature gas from the smelting reduction furnace 1 injected by the nozzles 13 into the prereduction furnace 2. The high temperature gas contains dust such as fine particles of iron ore having a size under 10 micrometers which cannot be removed by the dust collecting cyclone 23 shown in FIG. 1. These dust particles contain alkali compounds having Na and K which is sticky in the high temperature gas having the temperature over 900° C. These dust particles stick to the comparatively rough bottom surface 12b of the distributor 12 and to the inside surface of the nozzles 13 and are heated by the accumulated heat in the distributor and are sintered hard. Thus, the stuck dust particles gradually accumulate on the surfaces of distributor 12 and the flow of the gas is so much disturbed that a normal fluidizing can not be continued.

SUMMARY OF THE INVENTION

It is an object of the invention to provide a prereduction furnace of a smelting reduction facility of iron ores wherein the dust in the gas from the smelting reduction furnace does not stick to the distributor of the prereduction furnace.

The invention provides a prereduction furnace of a smelting reduction facility of iron ores comprising:

a fluidizing prereduction chamber installed at an upper part of the prereduction furnace wherein iron ores are fed and prereduced;

a gas blowing chamber installed at a lower part of the prereduction furnace wherein a reducing gas is fed;

a ceramic main body of a distributor installed between said fluidizing prereduction chamber and said gas blowing chamber;

a metal box attached to the bottom side of said ceramic main body of said distributor, wherein a cooling fluid flows;

a plurality of nozzles passing through said ceramic main body and said metal box for injecting said reducing gas in the blowing chamber into the prereduction chamber; and a dischage pipe, for discharging prereduced iron ores, installed at a bottom center portion of the prereduction chamber extending through the ceramic main body, the metal box, and a bottom of the gas blowing chamber.

A sheath pipe may be attached to the outside of the dischage pipe arranged so as to be concentric with the discharge pipe so that a clearance is formed between these two pipes. A cooling gas from the metal box may be introduced in the clearance and injected into the inside of the dischage pipe so that the prereduced iron ores do not clog the dischage pipe.

Instead of the ceramic main body, the main body of the distributor may be made of a metal box within which a cooling fluid flows in the passages thereof. The metal box may be divided into two parts, an upper part in which a cooling liquid flows and a lower part in which a cooling gas flows, to strongly cool the inside of the nozzles and to weakly cool the bottom surface of the distributor.

In both cases a ceramic layer may be installed on top of these metal boxes to minimize the heat transfer from the fluidizing bed to the distributor and to minimize the abrasion of the top surface of the distributor by the fluidizing paricles.

At least two horizontally movable gas purging pipes emitting a purging gas may be installed below the distributor to remove the dust stuck to the bottom of the distributor and the inside of the nozzles.

The discharge hole for discharging the prereduced iron ores may be installed at the side wall of the prereduction chamber.

DESCRIPTION OF THE PREFERRED EMBODIMENTS

Figure 1:
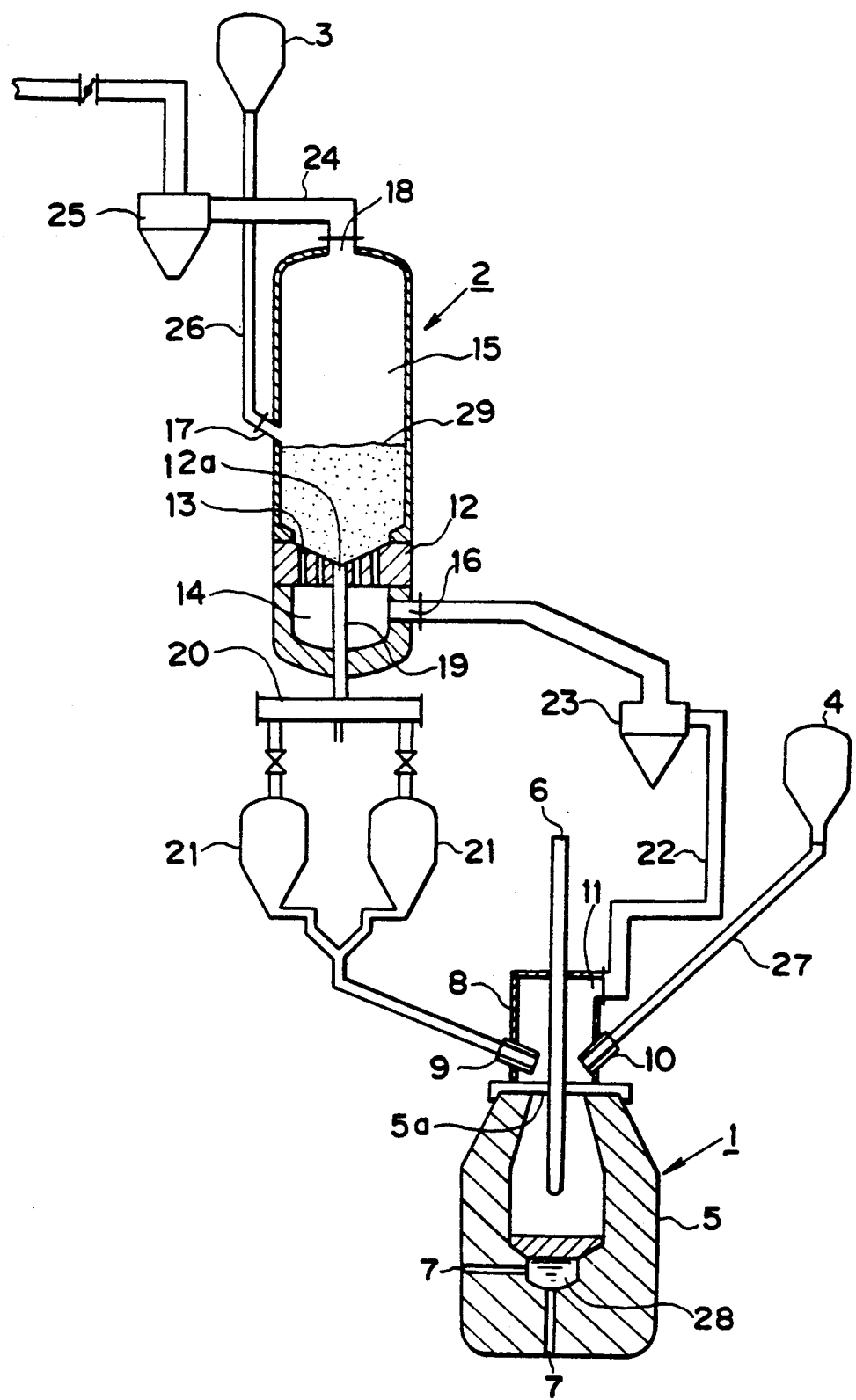
FIG. 1 is an explanatory illustration of a smelting reduction facility.
Figure 2:
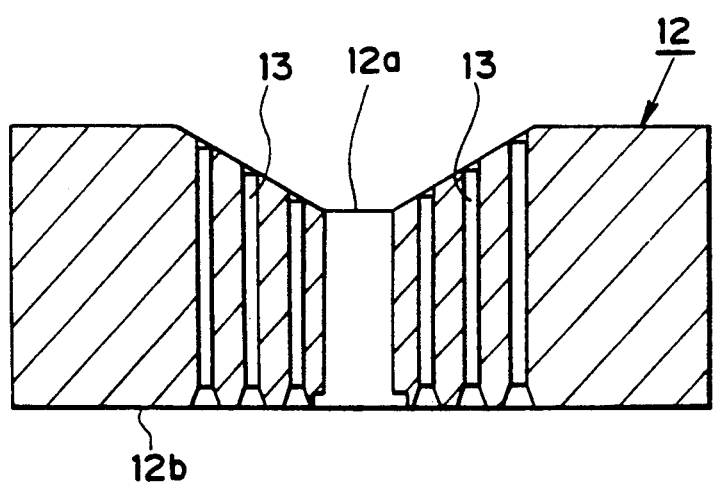
FIG. 2 is a vertical sectional view of the conventional type of distributor.

In the conventional distributor, the material of the distributor is a ceramics. The surface of the ceramics is generally rough.

Therefore, dust sticks to the surface of the distributor very easily. The material of the distributor of the present invention is partially or totally made of metal and cooled by one or two kinds of cooling fluid at the inside of the metal part. When the dust sticks to the metal surface, the dust solidifies rapidly by a cooling effect of the metal surface and is blown off by a flow of gas. The surface of the metal is smooth which enhances the removability of the stuck dust. Therefore the distributor is desirable to be made of metal.

However, the cooling of the distributor may cause a drop in the temperature of the injected gas which may decrease the thermal efficiency of the process.

The gas speed or flow rate at the bottom surface of the distributor is about 10 m/sec which is smaller than the gas speed at the inside of the nozzle of the distributor which is about 100 m/sec. The removability of the stuck dust at the bottom surface of the distributor is larger than at the inside of the nozzles of the distributor since the dust collides with the bottom surface with a smaller speed than the inside of the nozzles of the distributor.

Considering the aforementioned conditions the temperature at the bottom surface of the distributor is to be the temperature of the gas minus 100° C., and that at the inside surface of the nozzles of the distributor is to be several hundred degrees centigrade, and then the stuck dust can be removed easily. The heat loss through the bottom surface of the distributor is desirable to be less than that through the inside surface of the nozzles of the distributor in consideration of the removability of the stuck dust and the thermal efficiency of the prereduction reaction of iron ores.

Therefore, in a preferred arrangement for the cooling of the distributor, the nozzles of the distributor are cooled mainly by a liquid and the bottom surface of the distributor is mainly cooled by a gas. As for the top surface of the distributor which contacts the fluidizing iron ores, it suffers the abrasion by from fluidizing iron ores and it is feared that the heat loss through the cooled top surface of the distributor may be large. Therefore, in order to reduce the heat loss and the abrasion, the top layer of the distributor may be made of a ceramic layer. A gas purging device to force the stuck dust on the distributor to be removed, may be utilized to accelerate the dust removal. This gas purging device is equipped with nozzles for the injection of a purging gas directed to the bottom surface of the distributor.

On some occasion, the movement of the prereduced iron ores in the dischage hole is slow and overheating occurs. Then, the said iron ores are sintered to stick to each other or to the inside wall of the discharge pipe. As the result, the said iron ores are clogged at the dischage hole.

to prevent the such clogging, the cooling gas, after having cooled the bottom surface of the distributor and the inside surface of the nozzles, may be utilized to cool the prereduced iron ores by being injected into the discharge hole.

The discharging of the prereduced iron ores in the prereduction chamber may be done through a discharge hole attached to the side wall of the prereduction chamber.

EXAMPLES

Example 1

Figure 3:
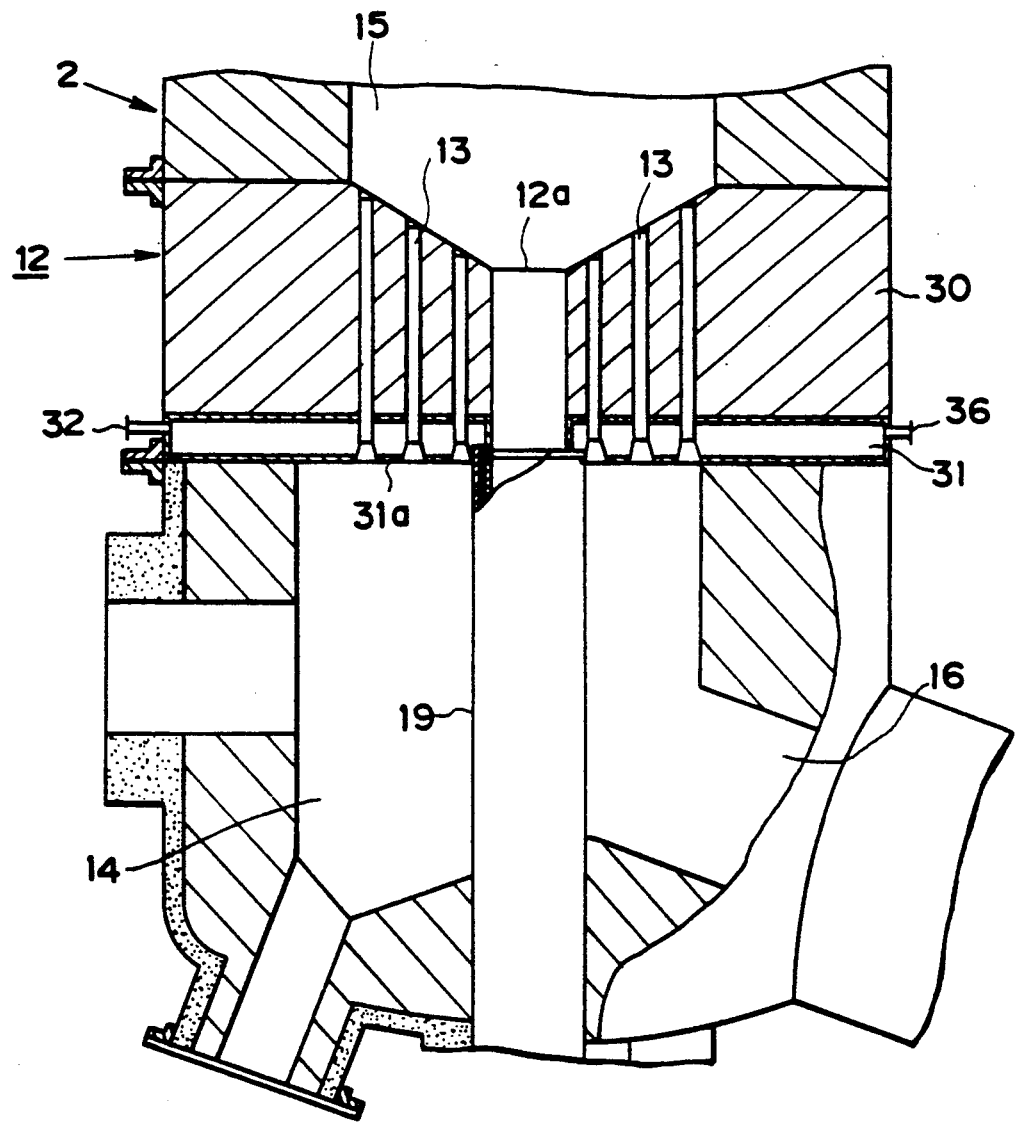
FIG. 3 is a vertical sectional view of an embodiment of the lower part of the prereduction furnace of the present invention.

FIG. 3 is a vertical sectional view of an embodiment of the lower part of the prereduction furnace of the insertion. The distributor 12 comprises a main body 30 made of a ceramics, and a metal box 31 fixed to the bottom of the main body. The inlet 32 is attached to the side wall of the metal box 31. The discharge hole 12a for discharging the prereduced iron ores is installed at the central parts of the main body 30 and the metal box 31. The cooling fluid, for instance a cooling gas, is discharged from the outlet 36 after the fluid cools the metal box. The bottom part of the distributor 12 facing the gas blowing chamber 14 is the metal box 31 of which the bottom surface 31a is smooth and made of, for instance, a stainless steel. Accordingly the dust contained in the gas discharged from the smelting reduction furnace 1 and introduced into the gas blowing chamber 14 is difficult to be stuck to the bottom surface 31a of the metal box 31.

A gas such as nitrogen is introduced into the metal box 31 via the inlet 32 and cools the metal box 31 including the bottom surface 31a. Therefore, the dust stuck to the bottom surface 31a of the metal box 31 solidifies rapidly and is blown off. As the result, the bottom open ends of the nozzles 13, which are situated at the bottom surface 31a of the metal box 31, are not clogged by the stuck dust.

The other notations and the functions of the parts of this embodiment are the same with those in the foregoing figures.

Example 2

Figure 4:
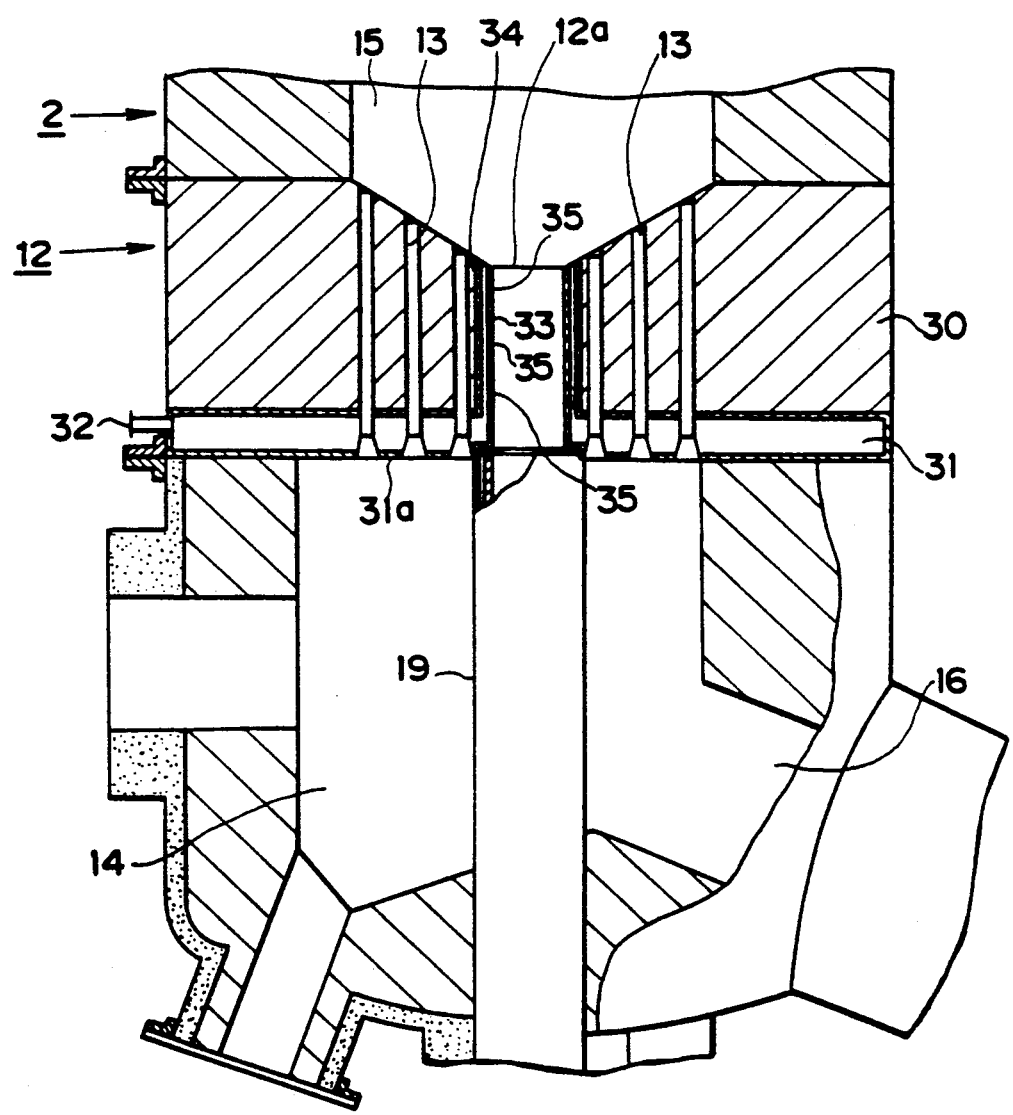
FIG. 4 is a vertical sectional view of an embodiment of the lower part of the prereduction furnace of the present invention.

FIG. 4 is a vertical sectional view of an embodiment of the lower part of the prereduction furnace of the invention. The distributor 12 comprises a main body 30 made of a ceramics, and a metal box 31 made of, for instance a stainless steel, fixed to the bottom of the main body. The inlet 32 is attached to the side wall of the metal box 31.

The discharge hole 12a for discharging the prereduced iron ores is installed at the central parts of the main body 30 and the metal box 31. The discharge hole 12a is connected to the pipe 33 made of, for instance a stainless steel, surrounded by the concentric sheath pipe 34. There is a clearance between the pipe 33 and the sheath pipe 34. The bottom end of the pipe 33 is connected to the discharge pipe 19 at the height of the bottom surface 31a of the metal box 31. The bottom end of the sheath pipe 34 is connected to the upper part of the metal box 31. A cooling gas introduced from the inlet 32 into the metal box 31 is led to the clearance between the sheath pipe 34 and the pipe 33. The injection nozzles 35 are installed in the wall of the pipe 33.

A cooling gas introduced into the metal box 31 through the inlet 32 passes through the inside of the metal box 31 and the clearance between the pipe 33 and the sheath pipe 34, and is injected by the injection nozzles 35 into the discharge inlet 12a. Then, the prereduced iron ores in the pipe 33 are not over-heated and are not sintered. As the result, the prereduced iron ores do not clog in the pipe 33. As for the cooling effect of the metal box on the bottom surface thereof and the inside of the nozzles, the dust does not stick to these surfaces as in Example 1 due to the internal cooling.

A more detailed explanation with actual values for an example facility is given below.

The distributor 12 of the prereduction furnace 2 having the height of 10 m and the internal diameter of 1 m comprised of the ceramic main body 30 and the metal box 31 made of a stainless steel attached to the bottom surface of the main body.

The pipe 33 with the diameter of 200 mm and the sheath pipe 34 having a clearance between them and being made of a stainless steel, are installed at the central parts of the main body 30 and the metal box 31.

A plurality of nozzles 13 having the internal diameter of 26 mm and being made of ceramics are installed at the main body 30 and the metal box 31.

Nitrogen gas for cooling is introduced via the inlet 32 into the metal box 31 at the flow rate of 500 $Nm^3/H$ and passes through the clearance between the pipe 33 and the sheath pipe 34 and is injected into the pipe 33 through the nozzles 35.

Iron ores having the maximum size of 8 mm are fed to the prereduction chamber 15 of the prereduction furnace 2 and preheated and prereduced in a fluidizing bed by the exhaust gas from the smelting reduction furnace 1 having the temperature of about 1000° C. injected by the nozzles 13 in the distributor 12.

As the result the nozzles 13 in the distributor 12 are not clogged by the stuck dust and the pipe 33 are not clogged by the adhesion of iron ores and smooth operation of prereduction is carried out.

The other notations and the functions of the parts of this embodiment are the same with those in the foregoing figures.

Example 3

Figure 5:
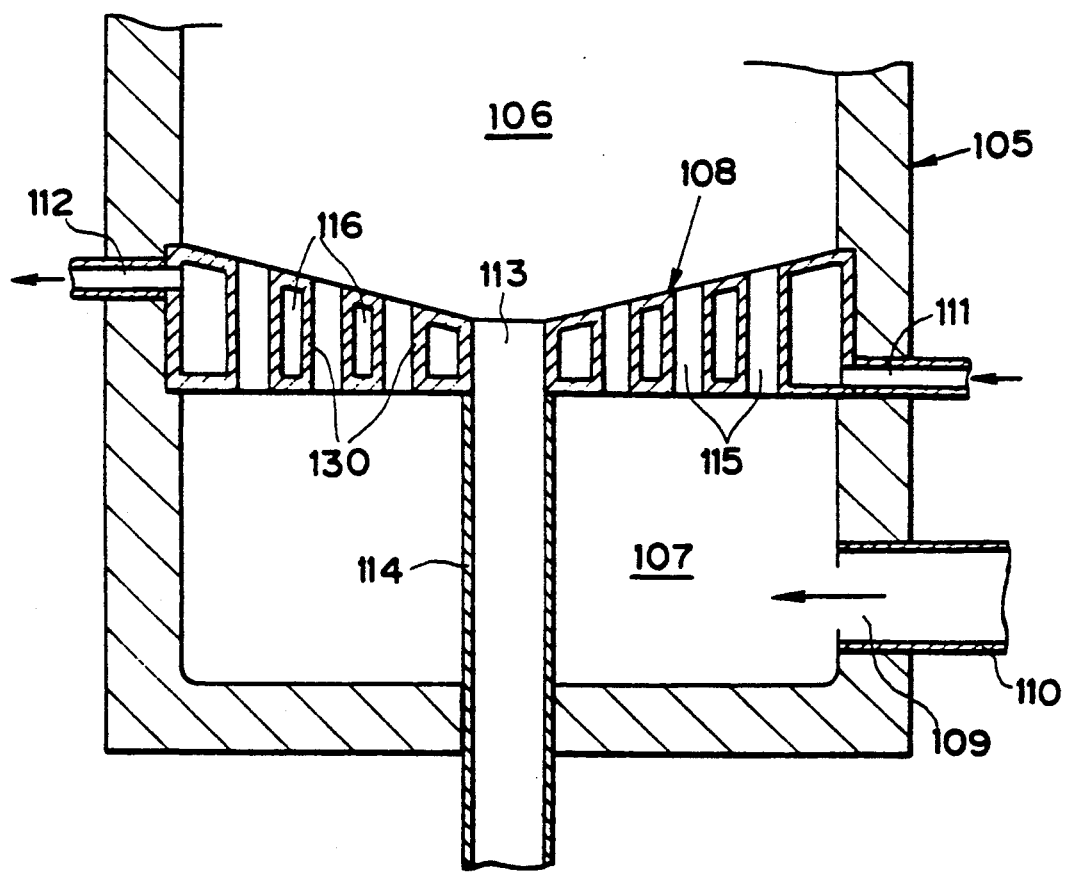
FIG. 5 is a vertical sectional view of an embodiment of the invention.

FIG. 5 is a vertical sectional view of an embodiment of the invention.

The prereduction furnace 105 comprises a prereduction chamber 106, the gas blowing chamber 107 and the distributor 108. The gas inlet 109 is installed in the gas blowing chamber 107 which is connected to the gas supply pipe 110.

Figure 6:
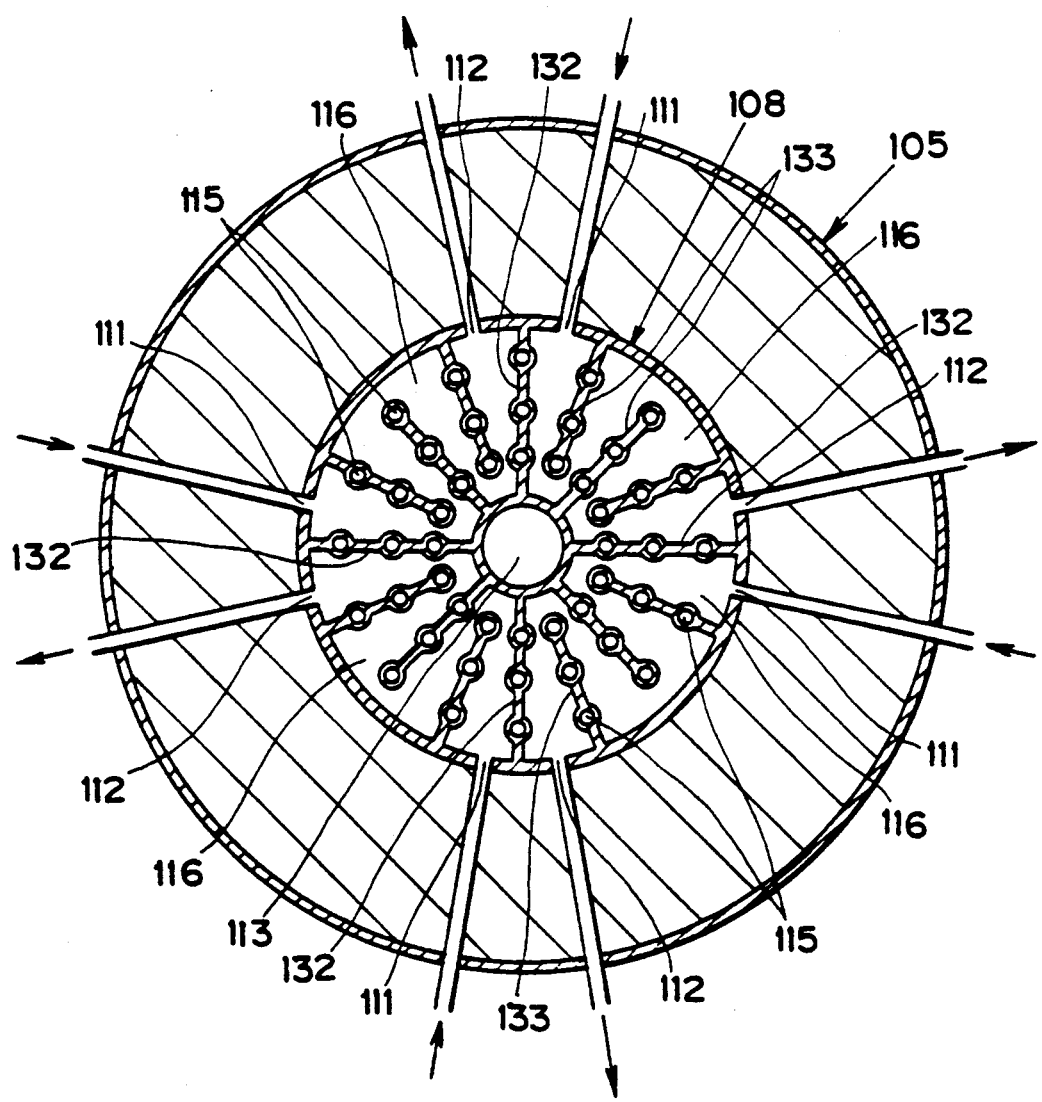
FIG. 6 is a horizontal sectional view of the distributor.

The distributor 108 comprises a metallic structure wherein the passage 116 for cooling fluid is formed. The nozzles 115 vertically pass through the partition walls 130. The inlet 111 and the outlet 112 for the cooling fluid are installed in the distributor 108. At the center of the distributor the discharge hole 113 for the prereduced ores is installed which is connected to the discharge pipe 114. The metallic structure is usually made by casting. FIG. 6 is a horizontal sectional view of the distributor. The space between the outer wall of the distributor 108 and the discharge hole 113 is radially partitioned into four passages 116 by the partition walls 132. The partition walls 133 are installed in the passages 116 for the cooling fluid to flow in snaky directions. The partition walls 132 and 133 contain a plurality of nozzles 115. The inlets 111 and the outlets 112 for cooling fluid are attached to the passages 116.

Figure 7:
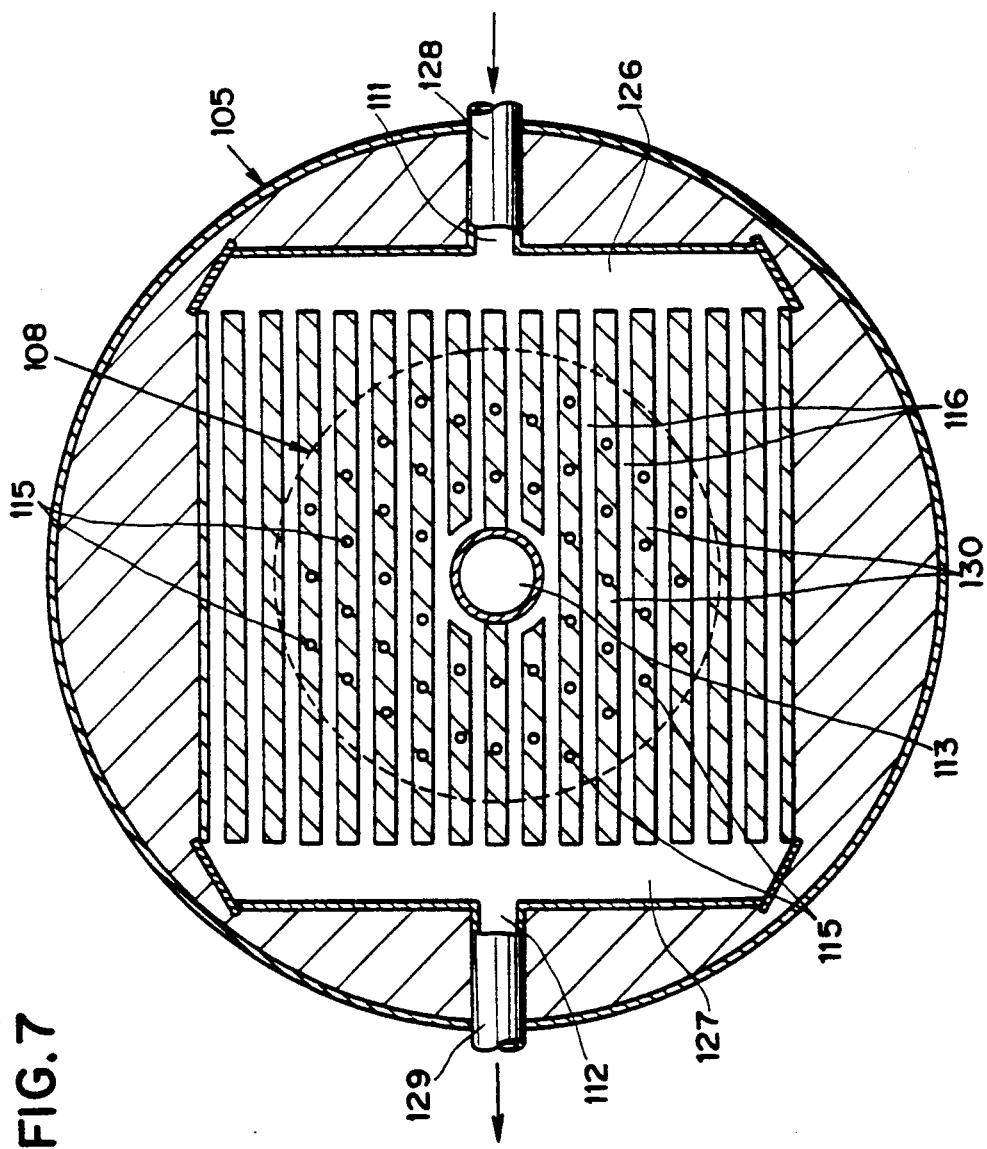
FIG. 7 is another horizontal sectional view of the distributor.

FIG. 7 is a horizontal sectional view of another type of the distributor. A plurality of passages 116 are parallely arranged at the inside of the distributor 108. The inlet and outlet ends of the passages 116 are connected to the headers 126 and 127 respectively. The inlet 111 and outlet 112 are attached to the headers 126 and 127 respectively. The feeding pipes 128 and 129 are installed at the headers 126 and 127 respectively. A plurality of nozzles 115 are installed in the partition walls 130 for the passages 116.

In this invention the top surface of the distributor is not restricted to the concave face as shown in FIG. 5. The surface may be a plane.

In these embodiments a cooling fluid introduced into the distributor 108 through the inlet 111 passes through a plurality of the passages 116 and discharged from the outlet 112. The cooling fluid lowers the temperature of the bottom surface of the distributor and the inside wall of the nozzles. The dust stuck to these surfaces rapidly solidifies due to the cooling and are easily blown off by a gas flow.

In this example a metal box is utilized for the distributor of the prereduction furnace. As the result the thickness of the distributor is about 200 mm which is small compared with the preceding example ceramic ditributor in which the thickness is about 700 mm.

Accordingly the contact area of the gas with the inner surface of the nozzles is very small compared with those in the ceramic distributor, and it significantly decreases the drop in the gas temperature.

Example 4

Figure 8:
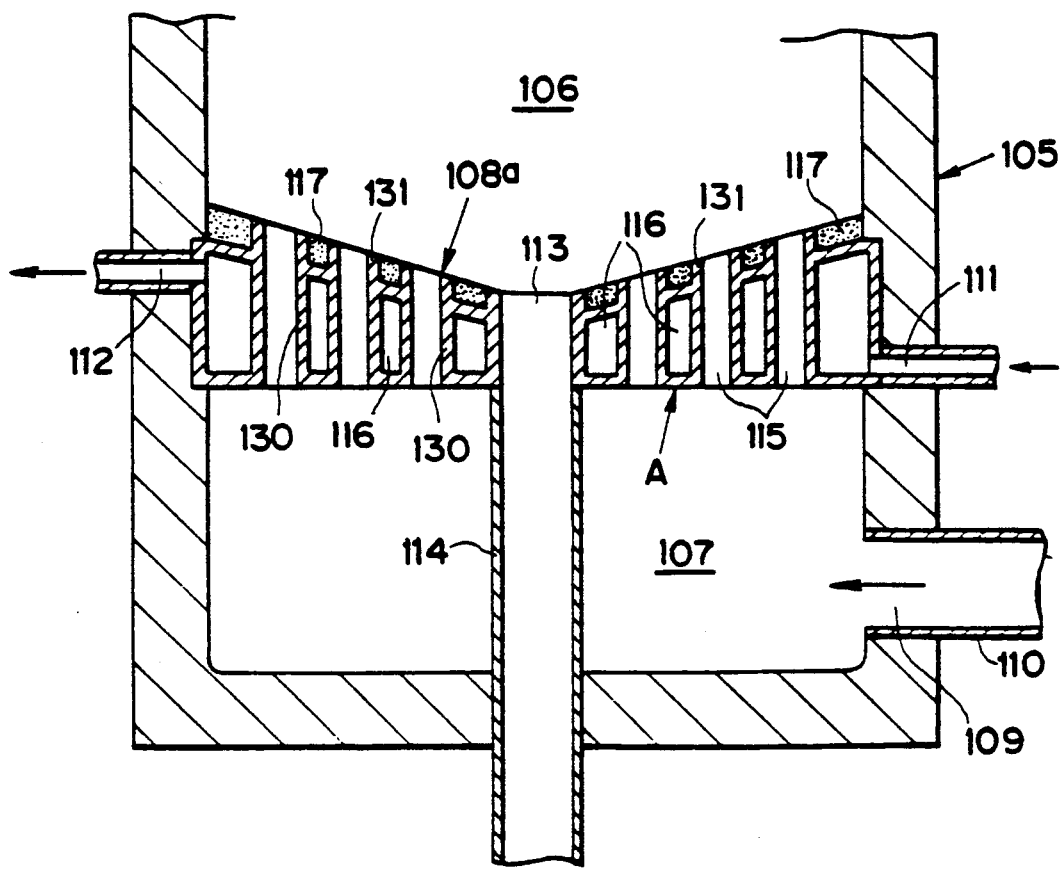
FIG. 8 is a vertical sectional view of an embodiment of the invention.

FIG. 8 is a vertical sectional view of an embodiment of the invention.

Figure 9:
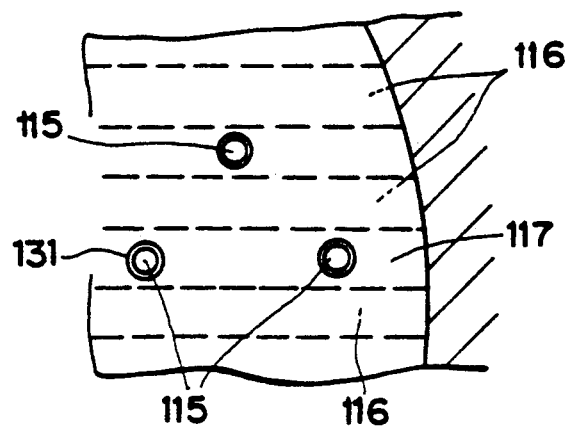
FIG. 9 is a schematic illustration of the top view of a ceramic layer arranged at the top of the distributor of FIG. 8.

FIG. 9 is a schematic illustration of the top view of ceramic layer arranged at the top of the distributor of FIG. 8. The ceramic layer 117 is arranged on top of the metallic structure A of the distributor 108a. The pipe structures 131 are extended from the nozzles 115 which pass through the ceramic layer 117 which is illustrated in FIG. 9. The other notations and the functions of the parts of the prereduction furnace are the same as those in FIG. 5. In this embodiment a cooling fluid introduced into the distributor 108a through the inlet 111 passes through a plurality of the passages 116 and is discharged from the outlet 112. The cooling fluid lowers the temperature of the bottom surface of the distributor and the inside wall of the nozzles. The dusts stuck to these surfaces rapidly solidify due to the cooling and are easily blown off by a gas flow.

In this embodiment the drop in the temperature of the fluidizing bed is advantageously small due to the ceramic layer 117 arranged at the top of the distributor 108a and the abrasion of the distributor 108 by the fluidizing particles is also advantageously small due to the ceramic layer 117, compared with a distributor with a water-cooled top surface.

Example 5

Figure 10:
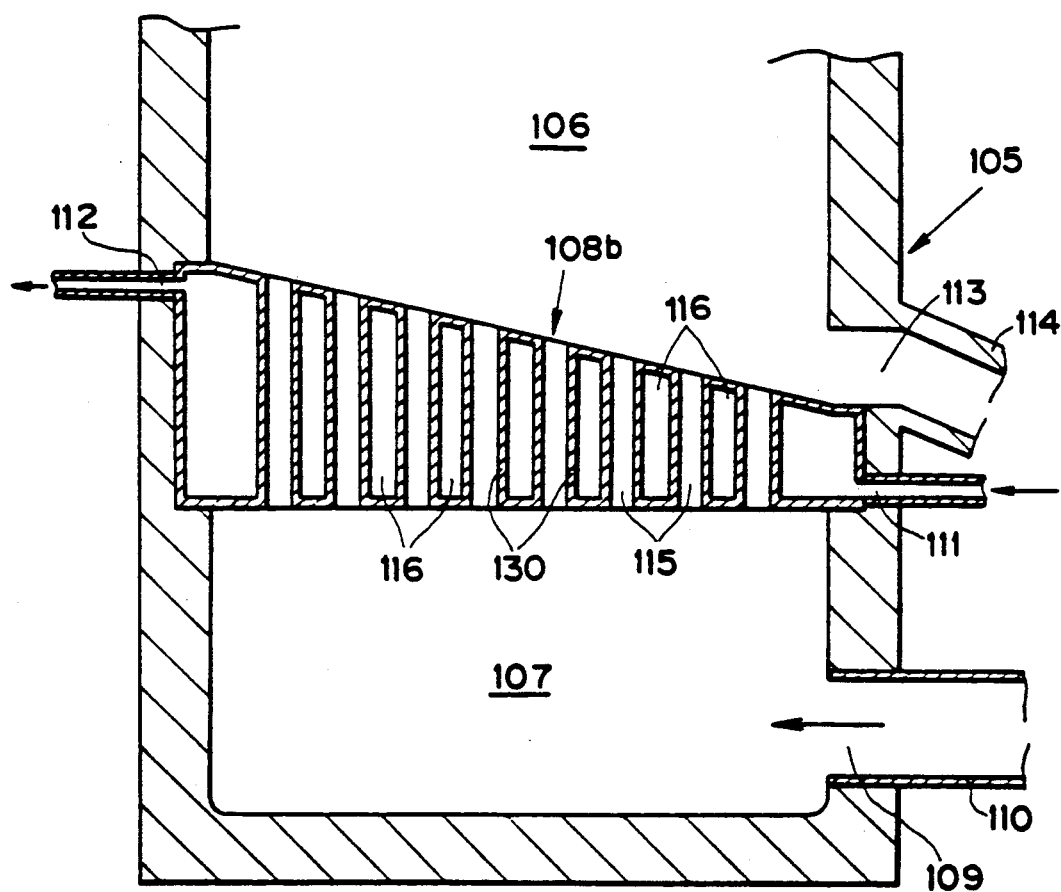
FIG. 10 is a vertical sectional view of an embodiment of the invention.

FIG. 10 is a vertical sectional view of an embodiment of the invention.

The outlet 113 is installed at the side wall of the prereduction chamber 106. The top surface of the distributor 108b is slanted towards the outlet 113 and prereduced iron ores are discharged through the outlet 113 by gravity. The notations in FIG. 8 are the same with those in FIG. 5. In this type of the distributor the ceramic layer as in FIG. 8 can be applied on top of the distributor. The function of this distributor is the same with those in Example 3.

Example 6

Figure 11:
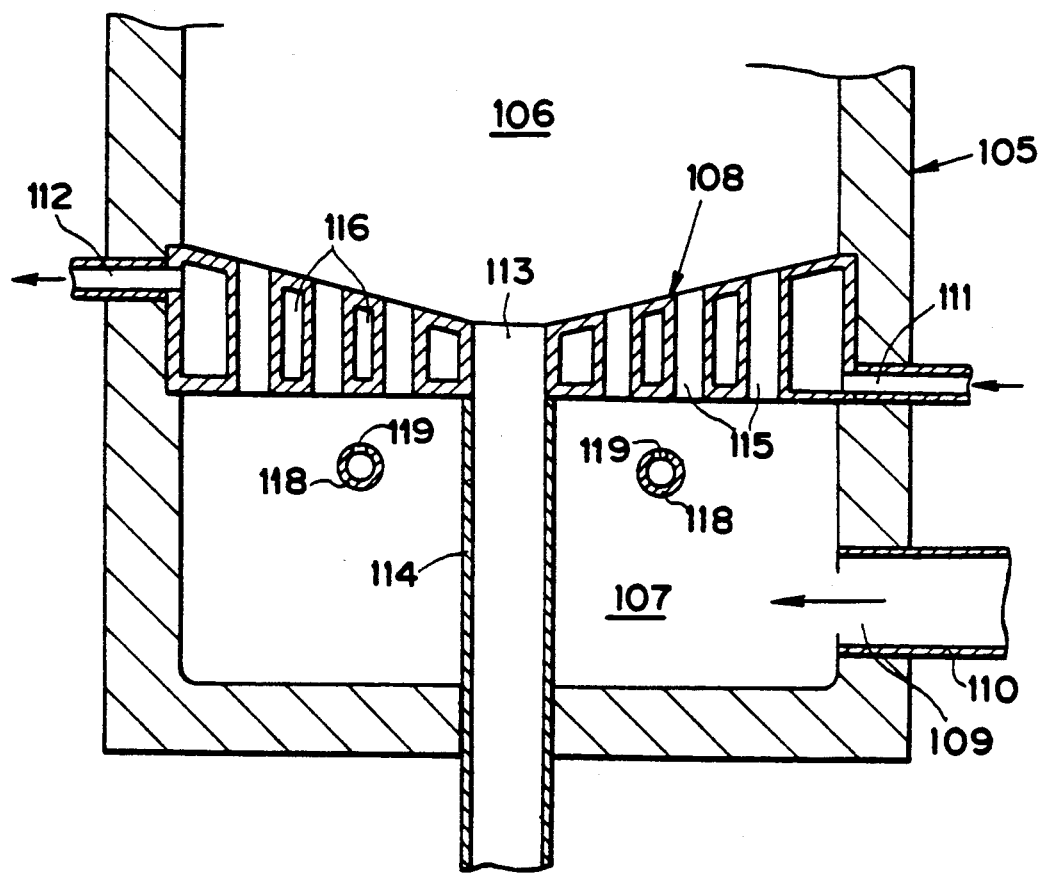
FIG. 11 is a vertical sectional view of an embodiment of the invention.
Figure 12:
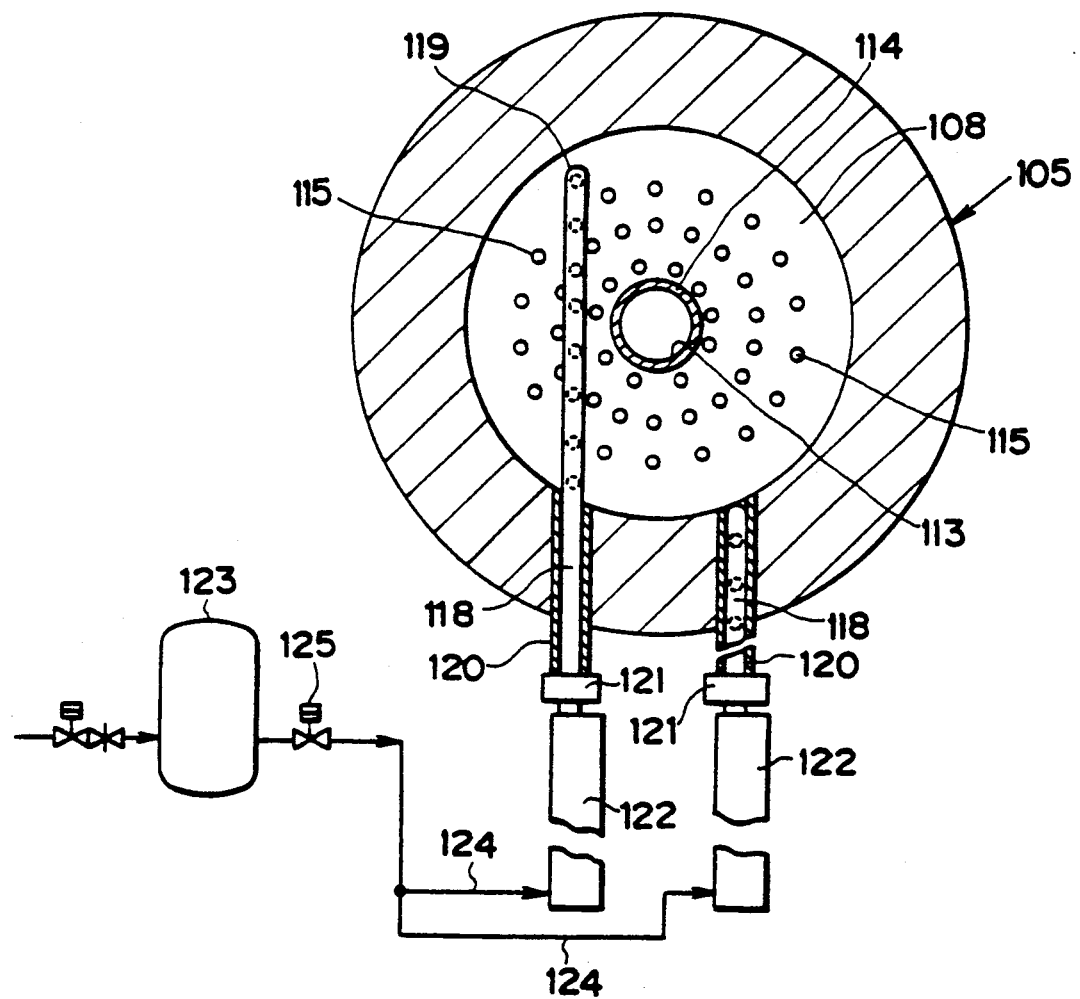
FIG. 12 is a partially cutaway view of the horizontal arrangement of the purging device.

FIG. 11 is a vertical sectional view of an embodiment of the invention. FIG. 12 is a partially cutaway view of the horizontal arrangement of the purging device. The notations and the functions in FIGS. 11 and 12 as for the prereducing furnace are the same with those in FIG. 5. Below the bottom side of the distributor 108 and at both sides of the discharge pipe 114, two gas purging pipes 118 are installed. The purging pipes 118 are horizontally movable and equipped with the gas injection nozzles 119 which inject a purging gas towards the bottom surface of the distributor 108. The sheath pipes 120 are installed at the side wall of the prereduction furnace 105 and the purging pipes 108 can be inserted in or retracted from the gas blowing chamber 107 through the sheath pipes 120. The moving mechanisms 121 are installed at the outside of the prereduction furnace 105.

The moving mechanisms have reciprocating chains the ends of which are held by an extended part of the furnace. By these reciprocating chains the purging pipes 118 are inserted in or retracted from the gas blowing chamber 107 through the sheath pipes 120.

The gas blowing pipes 122 are connected to the ends of the purging pipes 118 at the outside of the furnace. The conduit pipes 124 extended from the gas supply 123 are connected to the pipes 122. The valve 125 is installed in the conduit pipe 124.

The gas purging pipe may be rotated by a driving mechanism not shown in FIG. 12.

The gas purging pipes 118 can remove the dust stuck to the bottom surface of the distributor or the inside of nozzles 115 by blowing with a purging gas through the gas injection nozzles 119. The gas purging pipes 118 are usually retracted to the outside of the furnace and inserted to the gas blowing chamber 107 by the moving mechanisms 121, and inject the purging gas to the bottom surface of the distributor.

In this example, the dust stuck to the bottom surface of the distributor can easily be removed by being purged with a jet of a gas from the gas injection nozzles. Especially, since the dust in the easily removable state by the cooling of the distributor, the dust very easily removed by the purging.

This gas purging pipe 118 is applicable to the distributors shown in FIGS. 8 and 10.

Example 7

Figure 13:
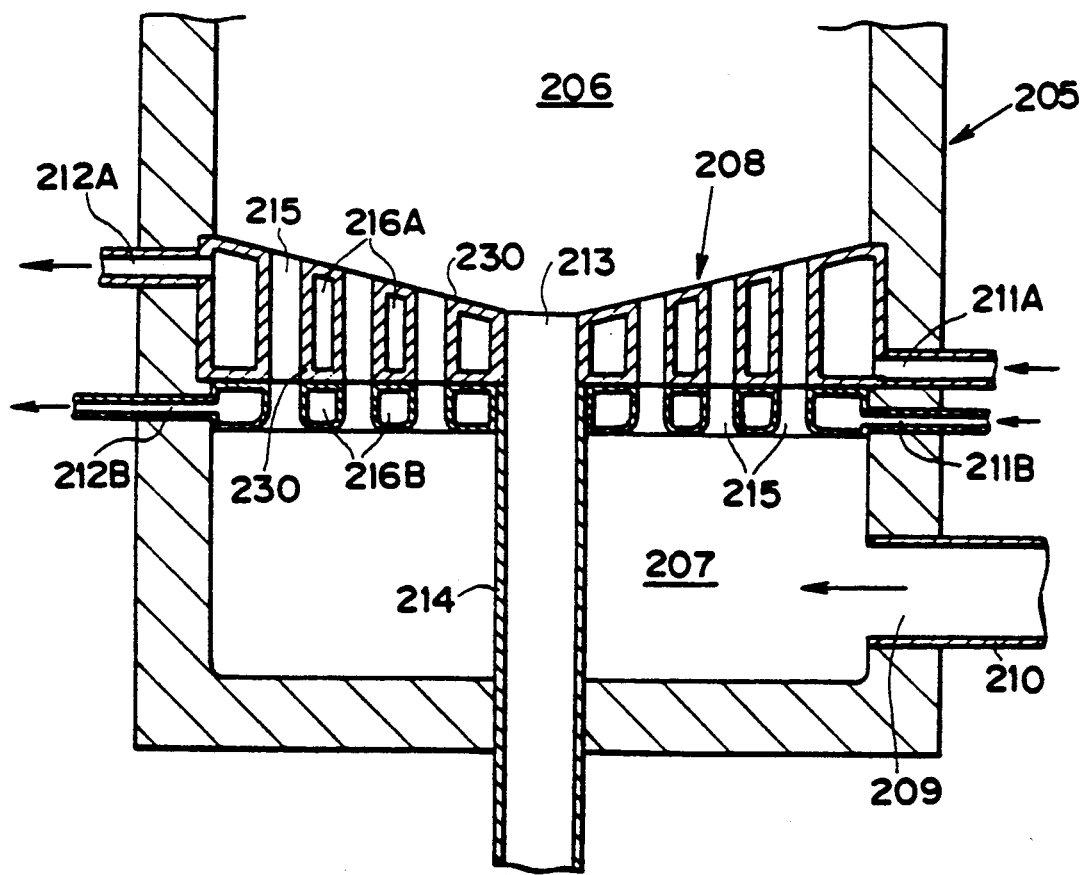
FIG. 13 is a vertical sectional view of an embodiment of the invention.

FIG. 13 is a vertical sectional view of an embodiment of the invention.

The prereduction furnace 205 comprises a the prereduction chamber 206, the gas blowing chamber 207 and the distributor 208. The gas inlet 209 is installed in the gas blowing chamber 207 which is connected to the gas supply pipe 210.

The distributor 208 comprises a metallic structure wherein the top passage 216A for cooling liquid and the bottom passage 216B for cooling gas are formed. The top passage 216A is installed mainly for cooling the inside of the nozzles 215 and the bottom passage 216B is installed for mainly cooling the bottom surface of the distributor 208. Accordingly the vertical length of the bottom passage 216B is smaller than that of the top passage 216A. The nozzles 215 are installed in the partition wall 230 which vertically pass through the partition wall 230. The inlet 211A and the outlet 212A for a cooling liquid are attached to the top passage 216A of the distributor 208. The inlet 211B and the outlet 212B for a cooling gas are attached to the bottom passage 216B of the distributor 208.

Figure 14:
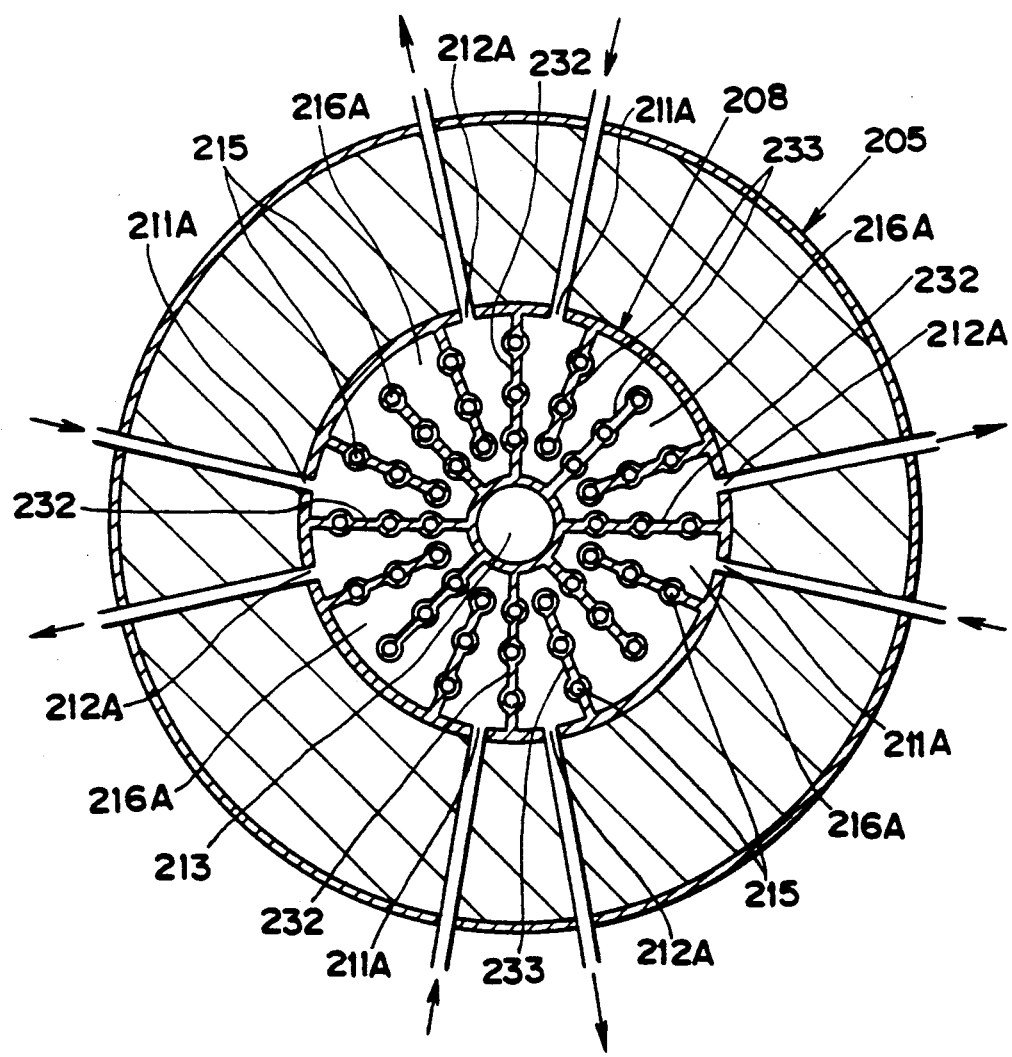
FIG. 14 is a horizontal sectional view of the distributor cut through the top passage 216A.

At the center of the distributor the discharge hole 213 for the prereduced iron ores is installed which is connected to the discharge pipe 214. The metallic structure is usually made by casting. FIG. 14 is a horizontal sectional view of the distributor cut through the top passage 216A. The space between the outer wall of the distributor 208 and the discharge hole 213 is radially partitioned in four passages 216A by the partition walls 232. The partition walls 233 are installed in the passage 216A for the cooling fluid to flow in snaky directions. The partition walls 232 and 233 contain a plurality of nozzles 215. The inlets 211A and the outlets 212A for cooling fluid are attached to the passages 216A.

Figure 15:
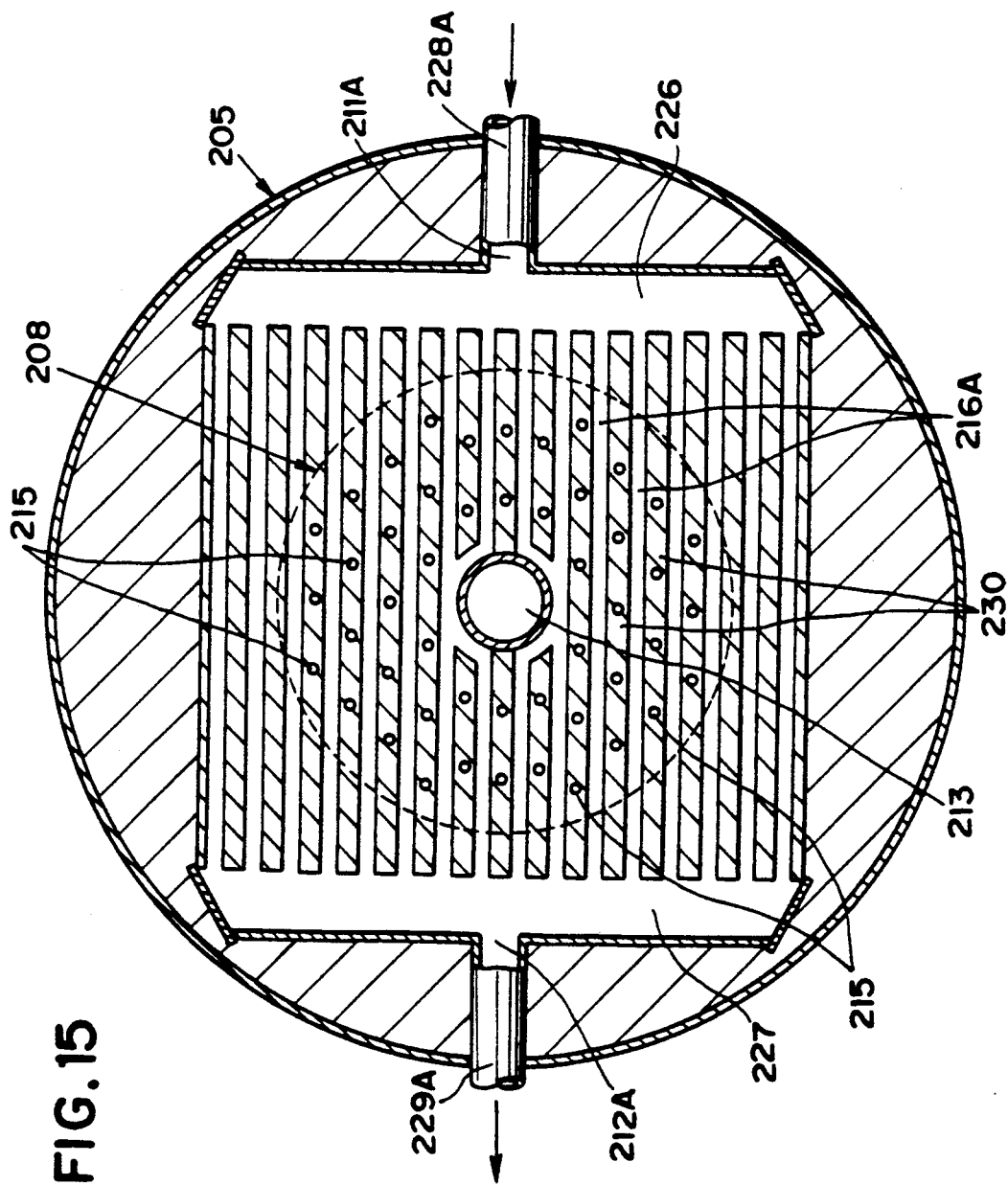
FIG. 15 is another horizontal sectional view of the distributor cut through the top passage 216A.

FIG. 15 is a sectional horizontal view of another type of the distributor cut through the top passages 216A. A plurality of passages 216A are parallely arranged at the inside of the distributor 208. The inlet and outlet ends of the passages 216A are connected to the headers 226 and 227 respectively. The inlet 211A and outlet 212A are attached to the headers 226 and 227 respectively. The feeding pipes 228A and 229A are installed at the headers 226 and 227 respectively. A plurality of nozzles are installed in the partition walls 230 for the top passage 216A.

In this invention the top surface of the distributor is not restricted to the concave face as shown in FIG. 13. The surface may be a plane.

In these embodiments the cooling fluids introduced into the distributor 208 through the inlets 211A and 211B pass through a plurality of the top passages 216A and the bottom passages 216B and are discharged from the outlets 212A and 212B. The cooling fluids lower the temperatures of the bottom surface of the distributor and at the inside wall of the nozzle. The dust stuck to these surfaces rapidly solidifies due to the cooling and is easily blown off by a gas flow.

In this example the inside of the nozzles is mainly cooled by the cooling liquid in the top passage 216A, and the bottom side of the distributor is mainly cooled by the cooling gas in the bottom passage 216B.

The dust stuck to the inside of the nozzle can be removed by the strong cooling of the liquid, and the dust stuck to the bottom of the distributor can be removed by the weak cooling of the gas since the strength of adhesion of the dust at the bottom surface of the distributor is small. The weak cooling by the gas improves the thermal efficiency of the furnace.

Example 8

Figure 16:
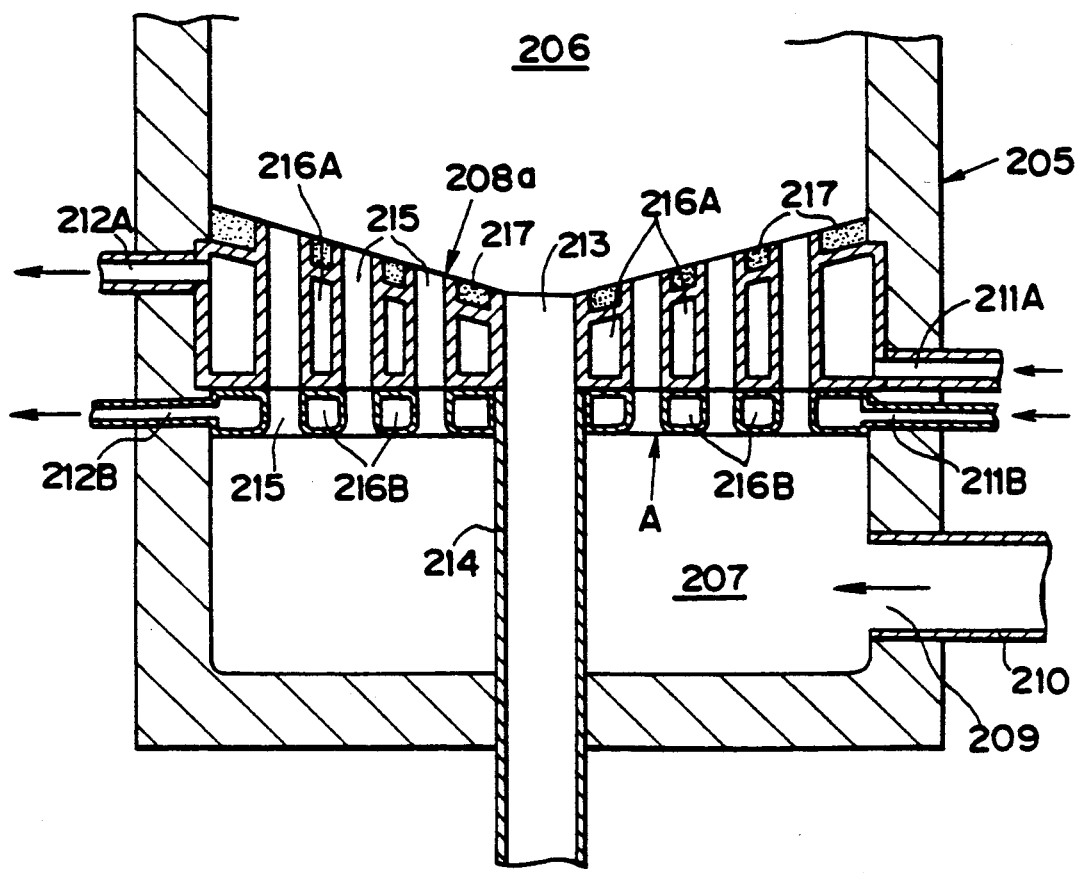
FIG. 16 is a vertical sectional view of an embodiment of the invention.

FIG. 16 is a vertical sectional view of an embodiment of the invention.

Figure 17:
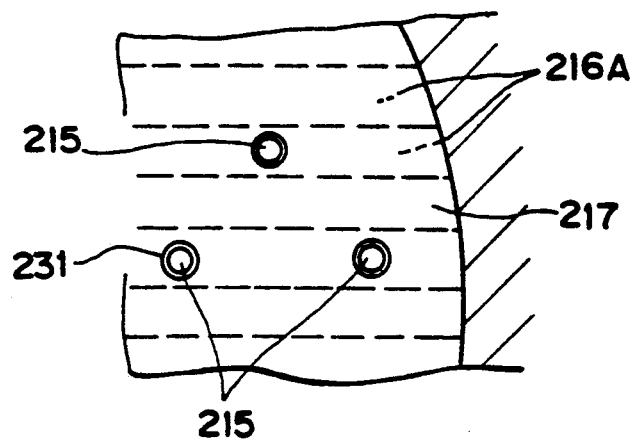
FIG. 17 is a schematic illustration of the top view of a cearamic layer arranged at the top of the distributor of FIG. 16.

FIG. 17 is a schematic illustration of the top view of the ceramic layer arranged at the top of the distributor of FIG. 16. The ceramic layer 217 is arranged on top of the metallic structure A of the distributor 208a. The pipe structures 231 are extended from the nozzles 215 which pass through the ceramic layer 217 which is illustrated in FIG. 17. The other notations of the parts of the prereduction furnace are the same with those in FIG. 13.

In this embodiment the cooling fluids introduced into the distributor 208a through the inlets 211A and 211B pass through a plurality of the top passages 216A and the bottom passages 216B and discharged from the outlet 212A and 212B. The cooling fluids lower the temperatures of the bottom surface of the distributor and at the inside of the nozzles. The dust stuck to these surfaces rapidly solidifies due to the cooling and is easily blown off by a gas flow.

In this example the inside of the nozzle is mainly cooled by the liquid in the top passages 216A, and the bottom side of the distributor is mainly cooled by the gas in the bottom passages 216B.

The dust stuck to the inside of the nozzle can be removed by the strong cooling by the liquid, and the dust stuck to the bottom of the distributor can be removed by the weak cooling of the gas since the strength of adhesion of the dust at the bottom surface of the distributor is small. The weak cooling by the gas improves the thermal efficiency of the furnace.

In this embodiment the drop in the temperature of the fluidizing bed is advantageously small due to the ceramic layer 217 arranged at the top of the distributor 208a and the abrasion of the top surface of the distributor 208a by the fluidizing particles is also advantageously small due to the ceramic layer 217, compared with a distributor with a water-cooled top surface.

Example 9

Figure 18:
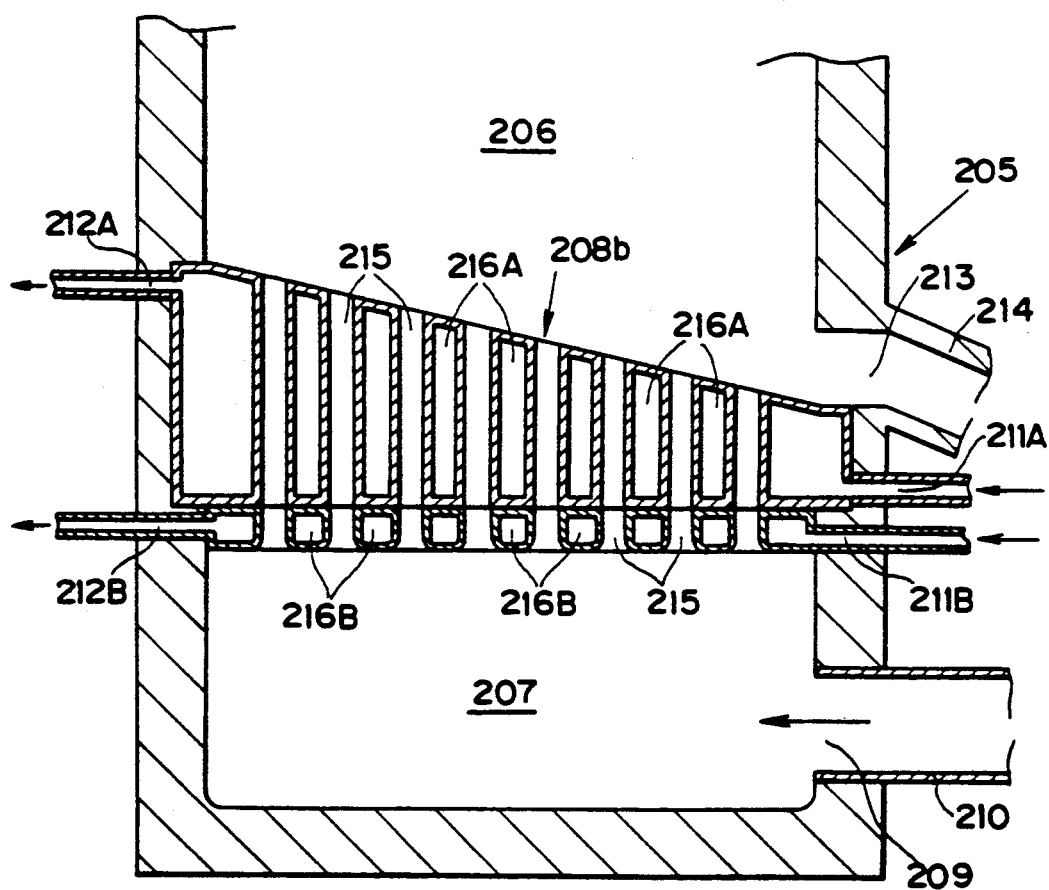
FIG. 18 is a vertical sectional view of an embodiment of the invention.

FIG. 18 is a vertical sectional view of an embodiment of the invention.

The outlet 213 is installed at the side wall of the prereduction chamber 206. The top surface of the distributor 208b is slanted towards the outlet 213 and prereduced iron ores are discharged through the outlet by gravity. The notations in FIG. 18 are the same with those in FIG. 13. In this type of the distributor the ceramic layer as in FIG. 16 can be applied on top of the distributor. The function of this distributor is the same with those in the foregoing examples.

Example 10

Figure 19:
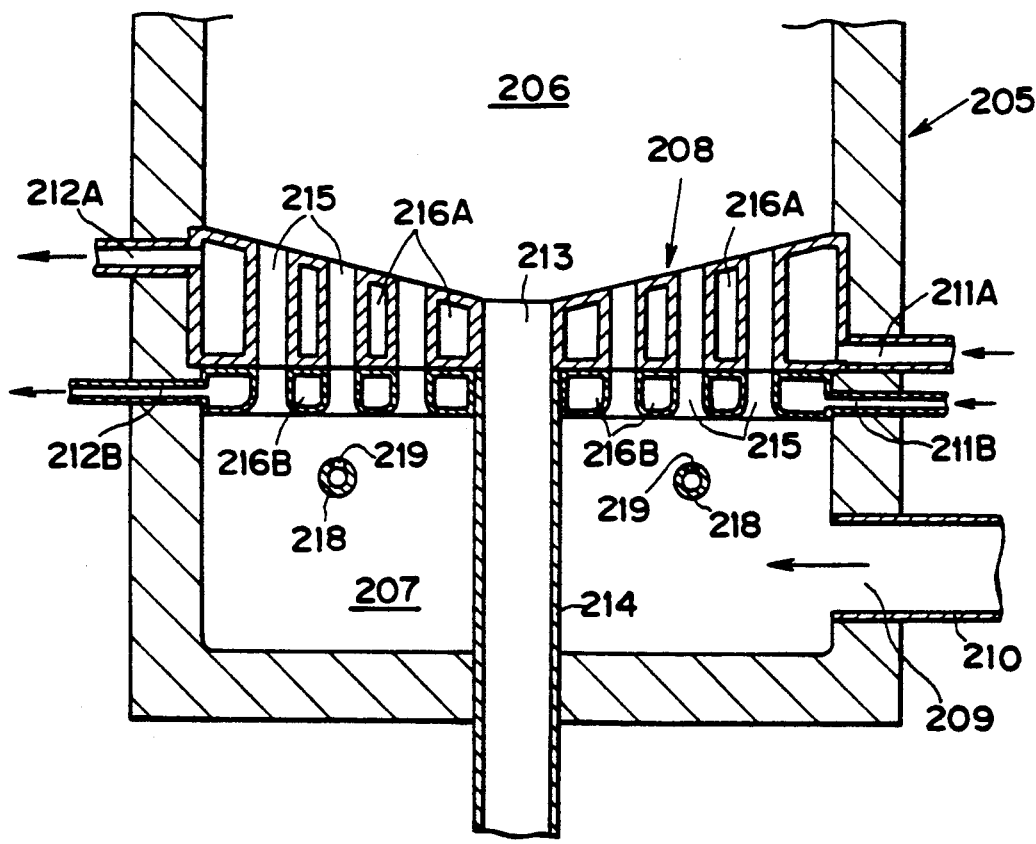
FIG. 19 is a vertical sectional view of an embodiment of the invention.
Figure 20:
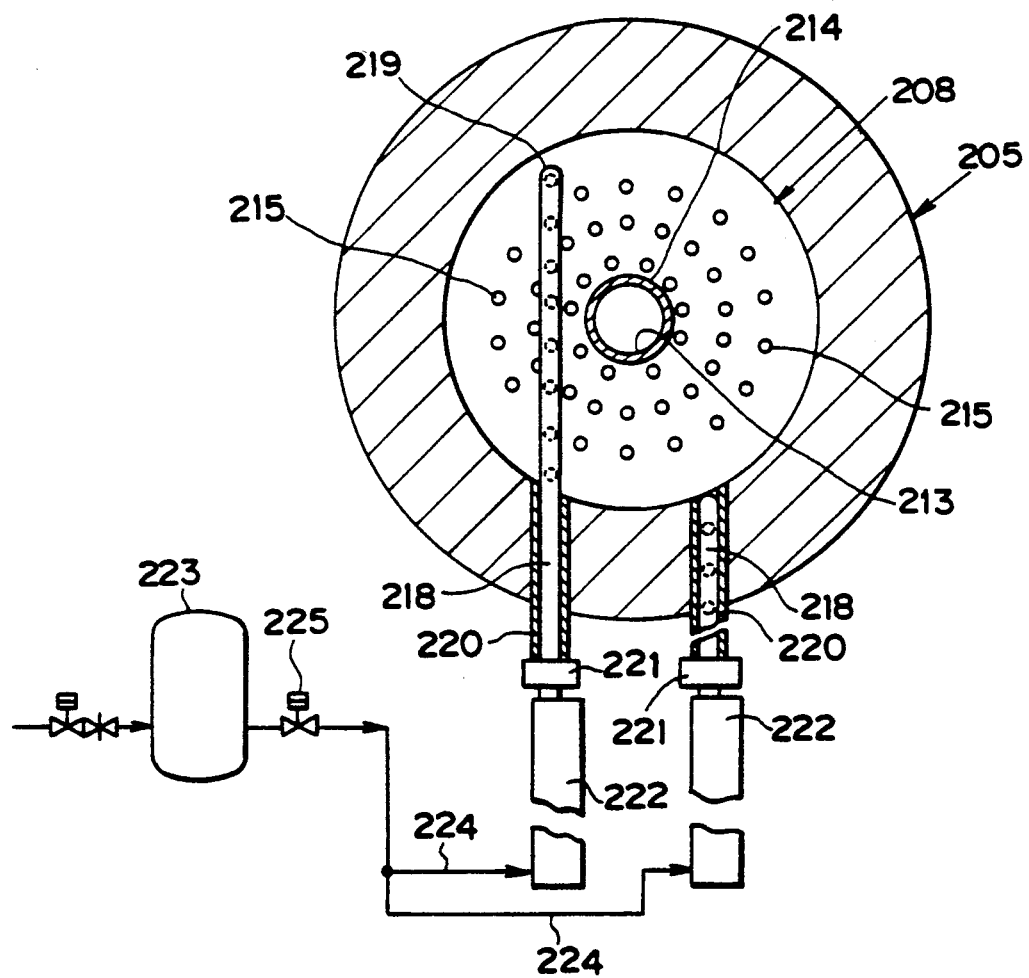
FIG. 20 is a partially cutaway view of the horizontal arrangement of the purging device.

FIG. 19 is a vertical sectional view of an embodiment of the invention. FIG. 20 is a partially cutaway view of the horizontal arrangement of the purging device. The notations in FIG. 19 as for the prereducing furnace are the same with those in FIG. 13. Below the bottom side of the distributor 208 and at both sides of the discharge pipe 214, two gas purging pipes 218 are installed. The purging pipes 218 are horizontally movable and equipped with the gas injection nozzles 219 which inject the purging gas towards the bottom surface of the distributor 208. The sheath pipes 220 are installed at the side wall of the prereduction furnace 205 and the purging pipes 218 can be inserted in or retracted from the gas blowing chamber 207 through the sheath pipes 220. The moving mechanisms 221 are installed at the outside of the prereduction furnace 205.

The moving mechanisms 221 have reciprocating chains the ends of which are held by an extended part of the furnace. By these reciprocating chains the purging pipes are inserted in or retracted from the gas blowing chamber 207 through the sheath pipe 220.

The gas blowing pipes 222 are connected to the ends of the purging pipes 218 at the outside of the furnace. The conduit pipes 224 extended from the gas supply 223 are connected to the gas blowing pipes 222. The valve 225 is installed in the conduit pipe 224.

The gas purging pipe 218 may be rotated by a driving mechanism not shown in FIG. 20.

This gas purging pipe 218 is also applicable to the distributors shown in FIGS. 16 and 18.

The gas purging pipe 218 can remove the dust stuck to the bottom surface of the distributor or the nozzles 215 by blowing a purging gas from the gas injection nozzles 219. The gas purging pipes 218 are usually retracted to the outside of the furnace and inserted into the gas blowing chamber 207 by the moving mechanisms 221, and inject the purging gas to the bottom surface of the distributor. In this example, the dust stuck to the bottom surface of the distributor can easily be removed by being purged with a jet of a gas from the gas injection nozzles. Especially, since the dust is in the easily removable state by the cooling of the distributor, the dust is very easily removed by the gas purging.

What is claimed is:

1. A prereduction furnace of a smelting reduction facility of iron ore, the prereduction furnace having an upper part where iron ores are fed thereto to be prereduced, and a lower part wherein a reducing gas is fed, the prereducing furnace comprising:
    a fluidizing prereduction chamber at the upper part of the prereduction furnace for receiving iron ores therein for prereduction;
    a gas blowing chamber at the lower part of the prereduction furnace for receiving a reducing gas therein;
    a distributor arranged in the prereduction furnace between said fluidizing prereduction chamber and said gas blowing chamber so as to separate said chambers from each other;
    said distributor including a ceramic main body mounted between said fluidizing prereduction chamber and said gas blowing chamber;
    a metal box attached at a bottom side of said ceramic main body of said distributor, said metal box including a passage therein in which a cooling fluid flows;
    a plurality of nozzles passing through said ceramic main body and through said metal box for injecting said reducing gas in said gas blowing chamber into said fluidizing prereduction chamber; and
    a discharge pipe mounted at a bottom portion of said fluidizing prereduction chamber and extending through said ceramic main body, through said metal box, and through a bottom of said gas blowing chamber, for discharging prereduced iron ores from the prereduction furnace.

2. The prereduction furnace of claim 1, wherein said discharge pipe is mounted at a bottom center portion of said fluidizing prereduction chamber.

3. A prereduction furnace of a smelting reduction facility of iron ore, the prereduction furnace having an upper part where iron ores are fed thereto to be prereduced, and a lower part wherein a reducing gas is fed, the prereducing furnace comprising:
    a fluidizing prereduction chamber at the upper part of the prereduction furnace for receiving iron ores therein for prereduction;
    a gas blowing chamber at the lower part of the prereduction furnace for receiving a reducing gas therein;
    a distributor arranged in the prereduction furnace between said fluidizing prereduction chamber and said gas blowing chamber so as to separate said chambers from each other;
    said distributor including a ceramic main body mounted between said fluidizing prereduction chamber and said gas blowing chamber;
    a metal box attached at the bottom side of said ceramic main body of said distributor, said metal box including a passage therein in which a cooling gas flows;
    a first plurality of nozzles passing through said ceramic main body and through said metal box for injecting said reducing gas in said gas blowing chamber into said fluidizing prereduction chamber; and
    a discharge pipe mounted at a bottom portion of said fluidizing prereduction chamber and extending through said ceramic main body, through said metal box, and through a bottom of said gas blowing chamber, for discharging prereduced iron ores from the prereduction furnace;
    a sheath pipe mounted around an outside of said discharge pipe and arranged concentrically with said discharge pipe so as to form a clearance between said discharge pipe and said sheath pipe, a bottom end of said sheath pipe being connected to an inside portion of said metal box; and
    a second plurality of nozzles on a wall of said discharge pipe for injecting said cooling gas into the interior of said discharge pipe from said metal box via said clearance.

4. The prereduction furnace of claim 3, wherein said discharge pipe is mounted at a bottom center portion of said fluidizing prereduction chamber.

5. A prereduction furnace of a smelting reduction facility of iron ore, the prereduction furnace having an upper part where iron ores are fed thereto to be prereduced, and a lower part wherein a reducing gas is fed, the prereducing furnace comprising:
    a fluidizing prereduction chamber at the upper part of the prereduction furnace for receiving iron ores therein for prereduction;
    a gas blowing chamber installed at the lower part of the prereduction furnace wherein a reducing gas is fed;
    a metal box arranged in the prereduction furnace between said fluidizing prereduction chamber and said gas blowing chamber so as to separate said chambers from each other, said metal box including at least one passage therein in which a cooling fluid flows, said metal box functioning as a distributor;

an inlet coupled to said metal box for feeding said cooling fluid into said at least one passage in said metal box;

an outlet coupled to said metal box for discharging the cooling fluid from said at least one passage of said metal box;

a plurality of nozzles passing through said metal box for injecting said reducing gas in said gas blowing chamber into said fluidizing prereduction chamber;

a discharge pipe mounted at a bottom portion of said fluidizing prereduction chamber and extending through said metal box and through a bottom of said gas blowing chamber; and said metal box having a plurality of said passages therein for flowing of said cooling fluid in said plurality of passages inside of said metal box.

6. The prereduction furnace of claim 5, wherein said discharge pipe is mounted at a bottom center portion of said fluidizing prereduction chamber.

7. The prereduction furnace of claim 5, further comprising a ceramic layer on a top of said metal box.

8. A prereduction furnace of a smelting reduction facility of iron ore, the prereduction furnace having an upper part where iron ores are fed thereto to be prereduced, and a lower part wherein a reducing gas is fed, the prereducing furnace comprising:

a fluidizing prereduction chamber at the upper part of the prereduction furnace for receiving iron ores therein for prereduction;

a gas blowing chamber installed at the lower part of the prereduction furnace wherein a reducing gas is fed;

a metal box arranged in the prereduction furnace between said fluidizing prereduction chamber and said gas blowing chamber so as to separate said chambers from each other, said metal box including at least one passage therein in which a cooling fluid flows, said metal box functioning as a distributor;

an inlet coupled to said metal box for feeding said cooling fluid into said at least one passage in said metal box;

an outlet coupled to said metal box for discharging the cooling fluid from said at least one passage of said metal box;

a first plurality of nozzles passing through said metal box for injecting said reducing gas in said gas blowing chamber into said fluidizing prereduction chamber;

a discharge pipe mounted at a bottom portion of said fluidizing prereduction chamber and extending through said metal box and through a bottom of said gas blowing chamber;

at least two horizontally movable gas purging pipes mounted in the prereduction furnace below said metal box;

a second plurality of nozzles coupled to said horizontally movable gas purging pipes and arranged inside said gas blowing chamber for injecting a purging gas to a bottom surface of said metal box to remove particles from the bottom surface of said metal box to prevent clogging of lower ends of said first plurality of nozzles; and said metal box having a plurality of said passages therein for flowing of said cooling fluid in said plurality of passages inside of said metal box.

9. The prereduction furnace of claim 8, wherein said discharge pipe is mounted at a bottom center portion of said fluidizing prereduction chamber.

10. The prereduction furnace of claim 9, further comprising a ceramic layer on a top of said metal box.

11. A prereduction furnace of a smelting reduction facility of iron ore, the prereduction furnace having an upper part where iron ores are fed thereto to be prereduced, and a lower part wherein a reducing gas is fed, the prereducing furnace comprising:

a fluidizing prereduction chamber at the upper part of the prereduction furnace for receiving iron ores therein for prereduction;

a gas blowing chamber installed at the lower part of the prereduction furnace wherein a reducing gas is fed;

a first metal box arranged in the prereduction furnace between said fluidizing prereduction chamber and said gas blowing chamber so as to separate said chambers from each other, said first metal box including at least one passage therein in which a cooling fluid flows, said first metal box functioning as a distributor;

a first inlet coupled to said first metal box for feeding said cooling fluid into said at least one passage in said first metal box;

a first outlet coupled to said first metal box for discharging the cooling fluid from said at least one passage of said first metal box;

a second metal box attached to a bottom of said first metal box, and including at least one passage therein in which a cooling fluid flows, said second metal box together with said first metal box functioning as a distributor;

a second inlet coupled to said second metal box for feeding said cooling fluid into said at least one passage in said second metal box;

a second outlet coupled to said second metal box for discharging the cooling fluid from at least one passage of said second metal box;

a plurality of nozzles passing through said first and second metal boxes for injecting said reducing gas in said gas blowing chamber into said fluidizing prereduction chamber;

a discharge pipe mounted at a bottom portion of said fluidizing prereduction chamber and extending through said distributor first metal box, through said second metal box, and through a bottom of said gas blowing chamber for discharging prereduced iron ores from the prereduction furnace; and said first and second metal boxes having a plurality of said passages therein for flowing of said cooling fluid in said respective passages inside of said first and second metal boxes.

12. The prereduction furnace of claim 11, wherein said discharge pipe is mounted at a bottom center portion of said fluidizing prereduction chamber.

13. The prereduction furnace of claim 11, further comprising a ceramic layer on a top of said first metal box.

14. The prereduction furnace of claim 11, wherein said cooling fluid flowing in said passages of said first metal box is a cooling liquid, and said cooling fluid flowing in said passages of said second metal box is a cooling gas.

15. A prereduction furnace of a smelting reduction facility of iron ore, the prereduction furnace having an upper part where iron ores are fed thereto to be prereduced, and a lower part wherein a reducing gas is fed, the prereducing furnace comprising:
- a fluidizing prereduction chamber at the upper part of the prereduction furnance for receiving iron ores therein for prereduction;
- a gas blowing chamber installed at the lower part of the prereduction furnace wherein a reducing gas is fed;
- a first metal box arranged in the prereduction furnace between said fluidizing prereduction chamber and said gas blowing chamber so as to separate said chambers from each other, said first metal box including at least one passage therein in which a cooling fluid flows, said first metal box functioning as a distributor;
- a first inlet coupled to said first metal box for feeding said cooling fluid into said at least one passage in said first metal box;
- a first outlet coupled to said first metal box for discharging the cooling fluid from said at least one passage of said first metal box;
- a second metal box attached to a bottom of said first metal box, and including at least one passage therein in which a cooling fluid flows, said second metal box together with said first metal box functioning as a distributor;
- a second inlet coupled to said second metal box for feeding cooling fluid into said at least one passage in said second metal box;
- a second outlet coupled to said second metal box for discharging the cooling fluid from at least one passage of said second metal box;
- a first plurality of nozzles passing through said first and second metal boxes for injecting said reducing gas in said gas blowing chamber into said fluidizing prereduction chamber;
- a discharge pipe mounted at a bottom portion of said fluidizing prereduction chamber and extending through said first metal box, through said second metal box, and through a bottom of said gas blowing chamber for discharging prereduced iron ores from the prereduction furnace;
- at least two horizontally movable gas purging pipes mounted in the prereduction furnace below said metal boxes;
- a second plurality of nozzles coupled to said horizontally movable gas purging pipes and arranged inside said gas blowing chamber for injecting a purging gas to a bottom surface of said metal boxes to remove particles from the bottom surface of said metal boxes to prevent clogging of lower ends of said first plurality of nozzles; and
- said first and second metal boxes having a plurality of said passages therein for flowing of said cooling fluid in said plurality of passages inside of said metal boxes.

16. The prereduction furnace of claim 15, wherein said discharge pipe is mounted at a bottom center portion of said fluidizing prereduction chamber.

17. The prereduction furnace of claim 15, further comprising a ceramic layer on a top of said first metal box.

18. A prereduction furnace of a smelting reduction facility of iron ore, the prereduction furnace having an upper part where iron ores are fed thereto to be prereduced, and a lower part wherein a reducing gas is fed, the prereducing furnace comprising:
- a fluidizing prereduction chamber at the upper part of the prereduction furnace for receiving iron ores therein for prereduction, said fluidizing prereduction chamber having a side wall;
- a gas blowing chamber at the lower part of the prereduction furnace for receiving a reducing gas therein;
- a distributor arranged in the prereduction furnace between said fluidizing prereduction chamber and said gas blowing chamber so as to separate said chambers from each other;
- said distributor including a ceramic main body mounted between said fluidizing prereduction chamber and said gas blowing chamber;
- a metal box attached at a bottom side of said ceramic main body of said distributor, said metal box including a passage therein in which a cooling fluid flows;
- a plurality of nozzles passing through said ceramic main body and through said metal box for injecting said reducing gas in said gas blowing chamber into said fluidizing prereduction chamber; and
- a discharge pipe arranged in said side wall of said fluidizing prereduction chamber for discharging prereduced iron ores from the prereduction furnace.

19. A prereduction furnace of a smelting reduction facility of iron ore, the prereduction furnace having an upper part where iron ores are fed thereto to be prereduced, and a lower part wherein a reducing gas is fed, the prereducing furnace comprising:
- a fluidizing prereduction chamber at the upper part of the prereduction furnace for receiving iron ores therein for prereduction, said fluidizing prereduction chamber having a side wall;
- a gas blowing chamber at the lower part of the prereduction furnace for receiving a reducing gas therein;
- a distributor arranged in the prereduction furnace between said fluidizing prereduction chamber and said gas blowing chamber so as to separate said chambers from each other;
- said distributor including a ceramic main body mounted between said fluidizing prereduction chamber and said gas blowing chamber;
- a metal box attached at the bottom side of said ceramic main body of said distributor, said metal box including a passage therein in which a cooling gas flows;
- a first plurality of nozzles passing through said ceramic main body and through said metal box for injecting said reducing gas in said gas blowing chamber into said fluidizing prereduction chamber; and
- a discharge pipe arranged in said side wall portion of said fluidizing prereduction chamber for discharging prereduced iron ores from the prereduction furnace;
- a sheath pipe mounted around an outside of said discharge pipe and arranged concentrically with said discharge pipe so as to form a clearance between said discharge pipe and said sheath pipe; and
- a second plurality of nozzles on a wall of said discharge pipe for injecting said cooling gas into the interior of said discharge pipe via said clearance.

20. A prereduction furnace of a smelting reduction facility of iron ore, the prereduction furnace having an upper part where iron ores are fed thereto to be prereduced, and a lower part wherein a reducing gas is fed, the prereducing furnace comprising:
- a fluidizing prereduction chamber at the upper part of the prereduction furnace for receiving iron ores therein for prereduction, said fluidizing prereduction chamber having a side wall;
- a gas blowing chamber installed at the lower part of the prereduction furnace wherein a reducing gas is fed;
- a metal box arranged in the prereduction furnace between said fluidizing prereduction chamber and said gas blowing chamber so as to separate said chambers from each other, said metal box including at least one passage therein in which a cooling fluid flows, said metal box functioning as a distributor;
- an inlet coupled to said metal box for feeding said cooling fluid into said at least one passage in said metal box;
- an outlet coupled to said metal box for discharging the cooling fluid from said at least one passage of said metal box;
- a plurality of nozzles passing through said metal box for injecting said reducing gas in said gas blowing chamber into said fluidizing prereduction chamber;
- a discharge pipe arranged in said side wall of said fluidizing prereduction chamber for discharging prereduced iron ores from the prereduction furnace; and
- said metal box having a plurality of said passages therein for flowing of said cooling fluid in said plurality of passages inside of said metal box.

21. The prereduction furnace of claim 20, further comprising a ceramic layer on a top of said metal box.

22. A prereduction furnace of a smelting reduction facility of iron ore, the prereduction furnace having an upper part where iron ores are fed thereto to be prereduced, and a lower part wherein a reducing gas is fed, the prereducing furnace comprising:
- a fluidizing prereduction chamber at the upper part of the prereduction furnace for receiving iron ores therein for prereduction, said fluidizing prereduction chamber having a side wall;
- a gas blowing chamber installed at the lower part of the prereduction furnace wherein a reducing gas is fed;
- a metal box arranged in the prereduction furnace between said fluidizing prereduction chamber and said gas blowing chamber so as to separate said chambers from each other, said metal box including at least one passage therein in which a cooling fluid flows, said metal box functioning as a distributor;
- an inlet coupled to said metal box for feeding said cooling fluid into said at least one passage in said metal box;
- an outlet coupled to said metal box for discharging the cooling fluid from said at least one passage of said metal box;
- a first plurality of nozzles passing through said metal box for injecting said reducing gas in said gas blowing chamber into said fluidizing prereduction chamber;
- a discharge pipe arranged in said side wall of said fluidizing prereduction chamber for discharging prereduced iron ores from the prereduction furnace; and
- at least two horizontally movable gas purging pipes mounted in the prereduction furnace below said metal box;
- a second plurality of nozzles coupled to said horizontally movable gas purging pipes and arranged inside said gas blowing chamber for injecting a purging gas to a bottom surface of said metal box to remove particles from the bottom surface of said metal box to prevent clogging of lower ends of said first plurality of nozzles; and
- said metal box having a plurality of said passages therein for flowing of said cooling fluid in said plurality of passages inside of said metal box.

23. The prereduction furnace of claim 22, further comprising a ceramic layer on a top of said metal box.

24. A prereduction furnace of a smelting reduction facility of iron ore, the prereduction furnace having an upper part where iron ores are fed thereto to be prereduced, and a lower part wherein a reducing gas is fed, the prereducing furnace comprising:
- a fluidizing prereduction chamber at the upper part of the prereduction furnace for receiving iron ores therein for prereduction, said fluidizing prereduction chamber having a side wall;
- a gas blowing chamber installed at the lower part of the prereduction furnace wherein a reducing gas is fed;
- a first metal box arranged in the prereduction furnace between said fluidizing prereduction chamber and said gas blowing chamber so as to separate said chambers from each other, said first metal box including at least one passage therein in which a cooling fluid flows, said first metal box functioning as a distributor;
- a first inlet coupled to said first metal box for feeding said cooling fluid into said at least one passage in said first metal box;
- a first outlet coupled to said first metal box for discharging the cooling fluid from said at least one passage of said first metal box;
- a second metal box attached to a bottom of said first metal box, and including at least one passage therein in which a cooling fluid flows, said second metal box together with said first metal box functioning as a distributor;
- a second inlet coupled to said second metal box for feeding said cooling fluid into said at least one passage in said second metal box;
- a second outlet coupled to said second metal box for discharging the cooling fluid from at least one passage of said second metal box;
- a plurality of nozzles passing through said first and second metal boxes for injecting said reducing gas in said gas blowing chamber into said fluidizing prereduction chamber;
- a discharge pipe arranged in said side wall of said fluidizing prereduction chamber for discharging prereduced iron ores from the prereduction furnace; and
- said first and second metal boxes having a plurality of said passages therein for flowing of said cooling fluid in said respective passages inside of said first and second metal boxes.

25. The prereduction furnace of claim 24, further comprising a ceramic layer on a top of said first metal box.

26. The prereduction furnace of claim 24, wherein said cooling fluid flowing in said passages of said first metal box is a cooling liquid, and said cooling fluid flowing in said passages of said second metal box is a cooling gas.

27. A prereduction furnace of a smelting reduction facility of iron ore, the prereduction furnace having an upper part where iron ores are fed thereto to be prereduced, and a lower part wherein a reducing gas is fed, the prereducing furnace comprising:

a fluidizing prereduction chamber at the upper part of the prereduction furnace for receiving iron ores therein for prereduction, said fluidizing prereduction chamber having a side wall;

a gas blowing chamber installed at the lower part of the prereduction furnace wherein a reducing gas is fed;

a first metal box arranged in the prereduction furnace between said fluidizing prereduction chamber and said gas blowing chamber so as to separate said chambers from each other, said first metal box including at least one passage therein in which a cooling fluid flows, said first metal box functioning as a distributor;

a first inlet coupled to said first metal box for feeding said cooling fluid into said at least one passage in said first metal box;

a first outlet coupled to said first metal box for discharging the cooling fluid from said at least one passage of said first metal box;

a second metal box attached to a bottom of said first metal box, and including at least one passage therein in which a cooling fluid flows, said second metal box together with said first metal box functioning as a distributor;

a second inlet coupled to said second metal box for feeding cooling fluid into said at least one passage in said second metal box;

a second outlet coupled to said second metal box for discharging the cooling fluid from at least one passage of said second metal box;

a first plurality of nozzles passing through said first and second metal boxes for injecting said reducing gas in said gas blowing chamber into said fluidizing prereduction chamber;

a discharge pipe arranged in said side wall of said fluidizing prereduction chamber for discharging prereduced iron ores from the prereduction furnace;

at least two horizontally movable gas purging pipes mounted in the prereduction furnace below said metal boxes;

a second plurality of nozzles coupled to said horizontally movable gas purging pipes and arranged inside said gas blowing chamber for injecting a purging gas to a bottom surface of said metal boxes to remove particles from the bottom surface of said metal boxes to prevent clogging of lower ends of said first plurality of nozzles; and said first and second metal boxes having a plurality of said passages therein for flowing of said cooling fluid in said plurality of passages inside of said metal boxes.

28. The prereduction furnace of claim 27, further comprising a ceramic layer on a top of said first metal box.

* * * * *

UNITED STATES PATENT AND TRADEMARK OFFICE
CERTIFICATE OF CORRECTION

PATENT NO. : 5,149,487
DATED : September 22, 1992
INVENTOR(S) : MATSUO et al It is certified that error appears in the above-identified patent and that said Letters Patent is hereby corrected as shown below:

```
Column 1, line 34, delete "of" following "comprises".
Column 4, line 27, change "cearamic" to --ceramic--.
Column 5, line 11, change "the" after "suffers" to --from--.
Column 5, line 27, change "to prevent" to --To prevent--.
Column 5, line 42, change "insertion" to --invention--.
Column 6, line 40, change "comprised of" to --comprises--.
Column 9, line 2, after "dust", insert --is--.
Column 9, line 3, after "dust", insert --is--.
         Abstract:
    Line 2, following "includes", delete "of".
    Line 9, change "prevent" to --prevents--.
    Line 12, following "chamber", insert -- , --.
```

Signed and Sealed this

First Day of March, 199

*Attest:*

BRUCE LEHMAN

*Attesting Officer*  Commissioner of Patents and Trademarks